(12) United States Patent
Adair

(10) Patent No.: US 10,016,073 B2
(45) Date of Patent: *Jul. 10, 2018

(54) INTERLOCKING PANELS, MODULES WITH INTERLOCKING PANELS, AND A MODULAR DISPLAY CASE WITH INTERLOCKING MODULES WITH INTERLOCKING PANELS

(71) Applicant: Jeffrey Adair, Los Angeles, CA (US)

(72) Inventor: Jeffrey Adair, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/826,329

(22) Filed: Nov. 29, 2017

(65) Prior Publication Data

US 2018/0078056 A1 Mar. 22, 2018

Related U.S. Application Data

(62) Division of application No. 15/072,091, filed on Mar. 16, 2016, now Pat. No. 9,833,085.

(51) Int. Cl.
*A47F 3/00* (2006.01)
*A47F 3/12* (2006.01)
*A47B 96/20* (2006.01)
*A47B 47/04* (2006.01)

(52) U.S. Cl.
CPC ............. *A47F 3/12* (2013.01); *A47B 47/042* (2013.01); *A47B 47/047* (2013.01); *A47B 96/20* (2013.01)

(58) Field of Classification Search
CPC ............... Y10T 403/58; Y10T 403/587; Y10T 403/4602; A47B 47/042; A47F 5/005; A47F 3/005

USPC ..... 52/589.1, 591.1; 446/104, 111, 115, 116, 446/121; 312/140.4, 140.2, 265.5, 265.6; 108/60, 61

See application file for complete search history.

(56) References Cited

U.S. PATENT DOCUMENTS

| | | | | |
|---|---|---|---|---|
| 1,846,862 A | * | 2/1932 | Guthrie | A47F 5/005 312/140 |
| 1,961,486 A | * | 6/1934 | Hall | A47F 5/005 211/184 |
| 2,680,501 A | * | 6/1954 | Cunningham | E04C 2/423 229/120.36 |
| 2,712,200 A | * | 7/1955 | Dearling | A63H 33/06 193/25 E |
| 3,005,282 A | * | 10/1961 | Christiansen | A63H 33/086 446/128 |

(Continued)

FOREIGN PATENT DOCUMENTS

| DE | 202014103445 | * | 10/2014 |
| EP | 801912 | * | 10/1997 |
| WO | 8400024 | * | 1/1984 |

OTHER PUBLICATIONS

International Search Report, 4 pages, dated May 12, 2017, from PCT/US17/22470 (Year: 2017).*

*Primary Examiner* — Janet M Wilkens
(74) *Attorney, Agent, or Firm* — Fulwider Patton LLP

(57) ABSTRACT

Interlocking panels are assembled to form modules, and the modules are assembled to form a modular display case, for displaying, transporting and storing objects such as models, display items or valuable collectibles. The interlocking panels include interlocking side edge ball key tab including a resilient, compressible ball key, and ports for removably receiving the ball key tab and ball key.

15 Claims, 27 Drawing Sheets

(56) References Cited

U.S. PATENT DOCUMENTS

| | | | | |
|---|---|---|---|---|
| 3,316,041 A * | 4/1967 | Nelson | A47F 3/005 | 220/665 |
| 3,413,752 A * | 12/1968 | Perry | A63H 33/06 | 24/594.11 |
| 3,788,700 A * | 1/1974 | Wartes | A47B 3/00 | 108/101 |
| 4,055,924 A * | 11/1977 | Beaver, Jr. | A47B 47/042 | 297/440.13 |
| 4,082,356 A * | 4/1978 | Johnson | A47C 4/021 | 273/160 |
| 4,082,389 A * | 4/1978 | Stewart | A47B 43/04 | 312/258 |
| 4,277,122 A * | 7/1981 | Bargiel | A47B 88/941 | 312/348.1 |
| 4,359,249 A * | 11/1982 | Fischer | A47F 3/00 | 312/114 |
| 4,384,804 A * | 5/1983 | Cachia | B60R 22/34 | 242/379 |
| 4,708,510 A * | 11/1987 | McConnell | A61G 13/12 | 403/137 |
| 4,950,508 A * | 8/1990 | Cherouse | E04B 2/7405 | 403/345 |
| 5,183,430 A * | 2/1993 | Swann | A63H 33/04 | 446/104 |
| 5,306,198 A * | 4/1994 | Forman | A63F 9/0098 | 446/116 |
| 5,645,464 A * | 7/1997 | Chen | A63H 33/10 | 403/300 |
| 5,853,313 A * | 12/1998 | Zheng | A63H 33/065 | 403/345 |
| 5,924,778 A * | 7/1999 | TenBrink | A47F 3/004 | 312/107 |
| 5,938,496 A * | 8/1999 | Zheng | A63H 33/065 | 403/345 |
| 6,467,307 B1 * | 10/2002 | Watson | A44C 13/00 | 446/120 |
| 6,672,788 B2 * | 1/2004 | Hathaway | F16C 11/0619 | 403/132 |
| 6,802,168 B1 * | 10/2004 | Minnick | E04C 2/384 | 248/224.51 |
| 7,316,459 B2 * | 1/2008 | TenBrink | A47B 45/00 | 312/114 |
| 7,533,940 B1 * | 5/2009 | Zook | A47B 83/02 | 108/11 |
| 8,316,606 B2 * | 11/2012 | Siewert | E04F 13/10 | 52/483.1 |
| 2003/0107255 A1 * | 6/2003 | Willy | A47B 3/06 | 297/440.13 |
| 2003/0208979 A1 * | 11/2003 | Sorensen | A63H 33/062 | 52/591.1 |
| 2006/0289317 A1 * | 12/2006 | Vetuskey | A47F 7/03 | 206/304 |
| 2007/0087651 A1 * | 4/2007 | Ali | A63H 3/50 | 446/137 |
| 2013/0048632 A1 * | 2/2013 | Chen | B65D 9/24 | 220/4.33 |
| 2013/0336717 A1 * | 12/2013 | Gragg | F16L 317/00 | 403/345 |
| 2015/0342341 A1 * | 12/2015 | Glekas | A47B 47/0091 | 312/111 |
| 2016/0136536 A1 * | 5/2016 | Ben Shalom | A63H 33/102 | 403/345 |

* cited by examiner

INTERLOCKING PANELS, MODULES WITH INTERLOCKING PANELS, AND A MODULAR DISPLAY CASE WITH INTERLOCKING MODULES WITH INTERLOCKING PANELS

This Preliminary Amendment is being filed concurrently with an application that is a division of U.S. Ser. No. 15/072,091 filed Mar. 16, 2016, the entirety of which are incorporated herein by reference.

BACKGROUND

This invention relates generally to interlocking panels having keyed mortise and tenon joints and assemblies of panels having through mortise and through loose tenon joints, and more particularly relates to assemblies of such interlocking panels to form interlocking modules, and more specifically relates to modular display cases with interlocking modules having such interlocking panels.

Conventional modular display cases are typically assembled from laser cut interlocking pieces, such as interlocking plastic boxes, for example that must be either glued or otherwise bonded together, or must be mechanically attached to one another, such as with screws or other types of fasteners. Traditional modular structures formed from wood panels having keyed mortise and tenon joints typically are large and heavy due to the size and thickness of supports and shelving used, and lack suitable windows or transparency. When such modular structures are formed of wood with keyed mortise and tenon joints, the typical key is wedge-shaped, making assembly and disassembly of modular display structures difficult and painstakingly tedious. Keyed mortise and tenon joint modular display cases formed of other materials such as metal or acrylic, for example, are disadvantageous because the typical key is wedge-shaped, and when such materials other than wood are used, the friction between the key and the panel is reduced, destabilizing the joint.

One system for assembling interlocking structures is known that includes interlocking hollow rectangular toy building blocks having cylindrical projections that interlock with one or more tubular projections on other toy building blocks, allowing the toy building blocks to be quickly and easily connected with relatively little force, but also allowing the connected toy building blocks to be disassembled with relatively little force.

A method for fabricating a modular foam container such as for storing and transporting game pieces utilizes a laser cutting apparatus to precisely cut and remove portions of foam in order to form text, indentations and protective compartments in the foam. While such containers are typically light and suitable for transportation of small items, the foam containers are not transparent, and do not readily permit interconnecting or interlocking of the foam containers in interlocking modules.

A modular display case is known that includes a base, a top, and foldable outer wall with a door for placement of objects in a cavity for display. The modular display case and a pedestal for the modular display case can be assembled manually with or without fasteners, and can be folded flat for packaging, shipping, and storage of the modular display case.

A geometric toy construction system is also known that includes flat, polygonal construction pieces with edgewise connectors that can be snap-fit together edge-to-edge to form two or three dimensional structures that can rotate about an axis of interconnection. Attachment sites accommodate flexible pipes that interconnect with one another, with a soft, pliable ball member, and with elastic bands that can be secured between attachment sites.

A ball and socket joint incorporating a detent mechanism also is known that can be used in flexible supports to hold and support items such as lamps, tools and faucets. Another ball joint coupling assembly is known that permits universal movement and positioning of an object with respect to a vertical support shaft, and that permits quick release and locking action, using a ball that is captured between annular jaw portions of a housing and a piston, with locking action being provided by gripping engagement of a piston jaw portion and a housing jaw portion.

A modular display case is known that includes one or more "C"-shaped frame members having a front face selectively enclosed with a window, and having grooves and bosses on an inside bottom surface for displaying model train components. The frame members each have a tongue feature and a locking structure that can be slidably engaged together to join the frame members end-to-end, and a second locking structure on a bottom surface and a corresponding locking structure on a top surface allow the frames to be connected vertically together. An expandable modular display case also is known that includes one or more L-shaped members having a tongue feature on a back edge and a groove on a back edge of another member for coupling the backs the members together.

A modular portable collectibles storage and display case for collectibles mounted on a base also is known that allows identical cases can be secured together, either stacked vertically or and horizontally side-by-side, and linked by a releasable hinge on each side, allowing the cases to open to display the collectibles. Another modular display case system also is known that includes side walls and a door formed of glass panels having side edges fastened together.

It would be desirable to provide interlocking panels that can be assembled into modular structures, and that can be made of transparent, lightweight materials that can be assembled into interlocking modular structures such as modular display cases to allow viewing of items placed in such modular display cases. It would be desirable to provide interlocking panels that can be assembled into modular structures that can be removably connected together by snap fit or pressure fit assembly, without the need for mechanical fasteners such as screws or bolts, and without the need for glue, adhesives or thermal bonding. It would also be desirable to provide interlocking display case modules with ferromagnetic targets attached to a layout or base panel allowing objects such as models or other display items for display, transport or storage to be magnetically secured within such interlocking display case modules, to allow such models or other display items to be safely secured a sufficient distance from the interlocking panels from which the modular structures are constructed to provide a safety zone surrounding the models or other display items. The present invention meets these and other needs.

SUMMARY OF THE INVENTION

Briefly, and in general terms, the present invention provides for interlocking panels, modules assembled with the interlocking panels, and a modular display case including an assembly of interlocking modules assembled with the interlocking panels, for use in displaying, transporting and storing objects such as models, display items or valuable collectibles, for example.

Accordingly, in a first preferred embodiment, the present invention provides for interlocking panels configured to be removably assembled together, including a first panel member having a side edge including a side edge ball key tab defined on the side edge of the first panel member, the ball key tab including a ball key retaining aperture defined in the ball key tab, a ball key removably received in the ball key retaining aperture of the ball key tab, and a second panel member including a ball key tab connecting port for removably receiving the ball key tab and the ball key. In a presently preferred aspect, the ball key retaining aperture of the ball key tab is circular, and the ball key comprises a round, resilient, compressible ball that can be pressed into and out of the ball key retaining aperture. In another presently preferred aspect, the ball key retaining aperture of the ball key tab is circular, and the ball key comprises a round, preferably spherical, resilient, compressible ball that can be pressed into and out of the ball key retaining aperture. In another presently preferred aspect, wherein the ball key is made of silicone rubber having a Shore A hardness from about 60 to about 90, and preferably is made of silicone rubber having a Shore A hardness from 70 to 85.

In another presently preferred aspect, the ball key tab connecting port is generally rectangular and includes a circular aperture in a middle portion of the ball key tab connecting port for removably receiving the ball key removably received in the ball key retaining aperture of the ball key tab. In another presently preferred aspect, the ball key tab connecting port is a side edge bridal joint ball key tab connecting port that is open at a side edge of the second panel member. In another presently preferred aspect, the ball key retaining aperture of the first panel member is positioned in the side edge ball key tab a sufficient distance from the side edge of the first panel member that when the side edge ball key tab is received in the side edge bridal joint ball key tab connecting port of the second panel member, the first and second panel members are aligned orthogonally with respect to each other.

In a second preferred embodiment, the present invention provides for a module with interlocking panels, wherein the module is configured to be removably connected with one or more other modules with interlocking panels. The module includes a pair of elongated first sidewall panel members, each of the elongated first sidewall panel members having opposing side edges, each of the opposing side edges of the elongated first sidewall panel members including a side edge ball key tab, and each the ball key tab including a ball key retaining aperture defined in the ball key tab. A ball key is removably received in each the ball key retaining aperture of the ball key tab, and the module includes a pair of elongated second sidewall panel members, each of the elongated second sidewall panel members having opposing side edges, each of the opposing side edges of the elongated second sidewall panel members including a ball key tab connecting port, corresponding ones of the ball key tabs and corresponding ones of the ball keys of the elongated first sidewall panel members being removably received in corresponding ones of the ball key tab connecting ports of the opposing side edges of the elongated second sidewall panel members, respectively.

In a presently preferred aspect, the ball key retaining aperture is circular, and the ball key is a round, preferably spherical, resilient, compressible ball that can be pressed into and out of the ball key retaining apertures. In another presently preferred aspect, the ball key is made of silicone rubber having a Shore A hardness from about 60 to about 90, and is preferably made of silicone rubber having a Shore A hardness from 70 to 85.

In another presently preferred aspect, the module includes one or more side edge bridal joint ball key tab connecting ports open at an upper side edge of one or more of the elongated second sidewall panel members. In another presently preferred aspect, the module includes an elongated divider panel member having opposing side edges, and one or more of the opposing side edges of the elongated divider panel member include a side edge ball key tab including a ball key retaining aperture defined in the ball key tab. The ball key retaining aperture preferably includes a ball key removably received in the ball key retaining aperture, and the ball key tab and the ball key of the elongated divider panel member is removably received in the one or more side edge bridal joint ball key tab connecting ports. In another presently preferred aspect, the ball key retaining aperture of the elongated divider panel member is positioned in the side edge ball key tab a sufficient distance from the side edge of the elongated divider panel member that when the side edge ball key tab is received in the side edge bridal joint ball key tab connecting port, the elongated divider panel member and the one or more of the elongated second sidewall panel members are aligned orthogonally with respect to each other.

In another presently preferred aspect, the module includes one or more stacking key tabs in a top side edge of each first sidewall panel member, and one or more stacking key slots in a bottom side edge of each first sidewall panel member for receiving a corresponding stacking key tab of another first sidewall panel member. In another presently preferred aspect, the module includes one or more corner stacking key tabs in a bottom side corner of each the second sidewall panel member, and one or more corner stacking key slots in a top corner side of each the second sidewall panel member for receiving a corresponding corner stacking key tab of another second sidewall panel member.

In another presently preferred aspect, the module includes a horizontal panel member removably connected to the elongated first sidewall panel members and/or the elongated second sidewall panel members. The horizontal panel member may be a base panel member removably connected to a lower portion of the least one of the pair of elongated first sidewall panel members and one of the pair of elongated second sidewall panel members. Another horizontal panel member may be provided that is a layout panel member preferably including least one recess in a top side of the layout panel member for receiving a display item.

In another presently preferred embodiment, the present invention provides for a modular display case including an assembly of a plurality of the modules with interlocking panels according to the invention. The interlocking panels and modular structures assembled from the interlocking panels can be made of transparent, lightweight materials such as acrylic panels, for example, that can be assembled into interlocking modules and modular display cases to allow viewing of items placed in such interlocking modules and modular display cases. The interlocking panels can be snap fit together for assembly and disassembly of the interlocking modules and modular display cases according to the invention, without mechanical fasteners, and without glue, adhesives or thermal bonding. The interlocking modules and modular display cases can be provided with ferromagnetic targets attached to a horizontal panel member such as a layout panel or base panel member, for example, allowing objects such as models or other display items for display, transport or storage, to be magnetically secured within such interlocking display case modules, to allow such models or other display items to be safely secured a sufficient distance from the interlocking panels from which the modular structures are constructed to provide a safety zone surrounding the models or other display items.

Other features and advantages of the present invention will become more apparent from the following detailed description of the preferred embodiments in conjunction with the accompanying drawings, which illustrate, by way of example, the operation of the invention.

BRIEF DESCRIPTION OF THE DRAWINGS

FIG. 1OF is a top plan view of another alternate layout panel member for the square display case module of FIGS. 10A to 10D.

DETAILED DESCRIPTION OF THE PREFERRED EMBODIMENTS

Figure 1A:
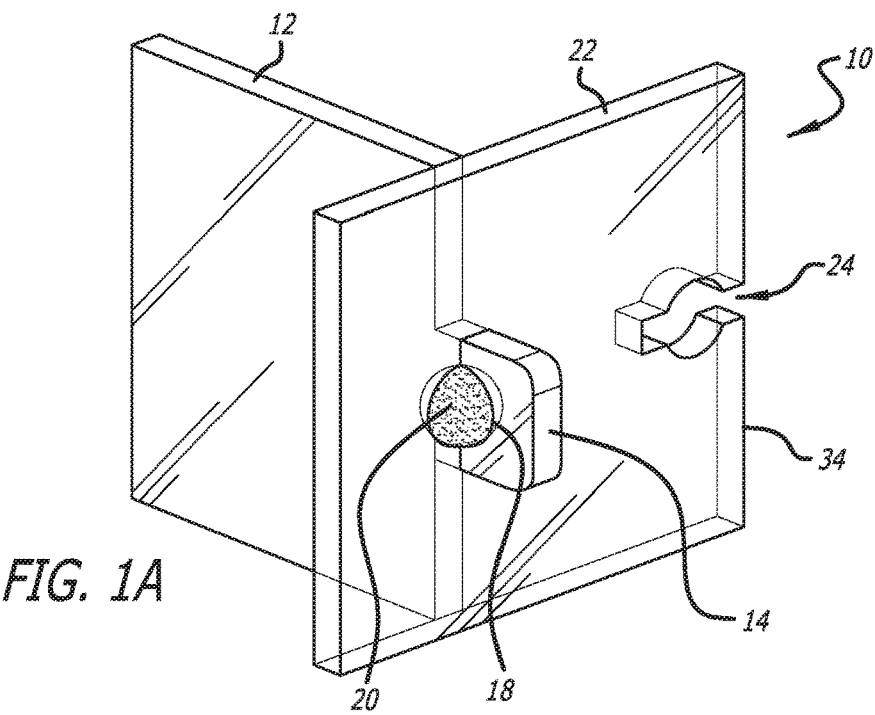
FIG. 1A is a top perspective view of a basic through mortise and tenon ball key joint formed by first and second panels with a ball key, according to a presently preferred embodiment of the invention.
Figure 1B:
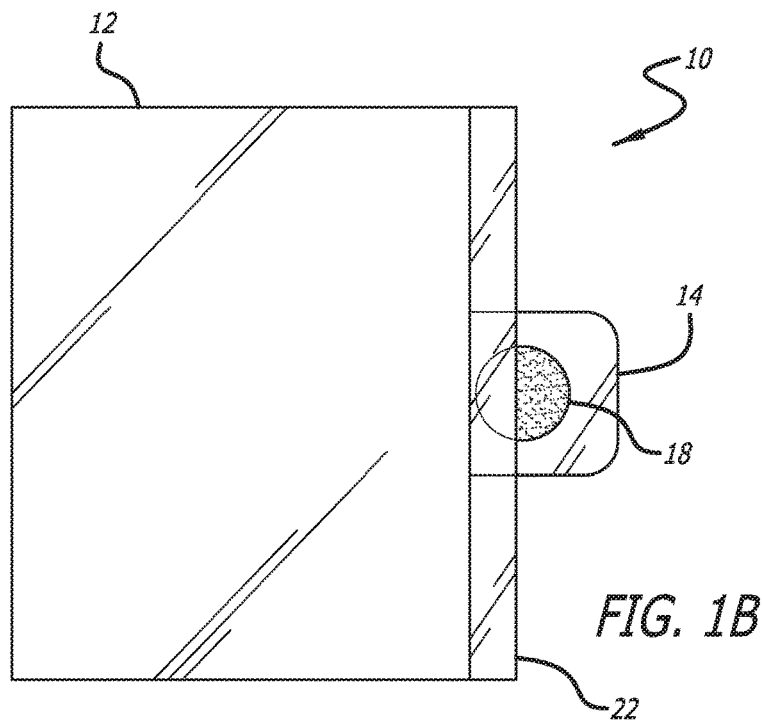
FIG. 1B is a top plan view of the basic through mortise and tenon ball key joint of FIG. 1A.
Figure 1C:
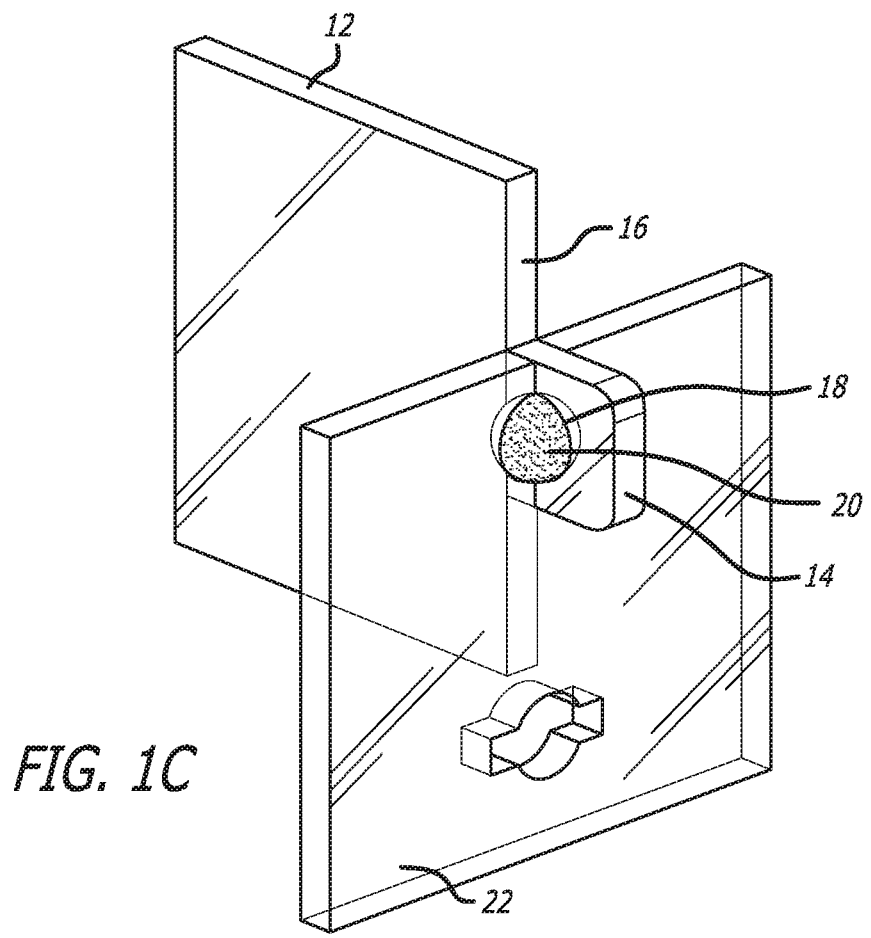
FIG. 1C is a top perspective view of a basic bridal joint formed by the first and second panels with the ball key of FIG. 1A.
Figure 1D:
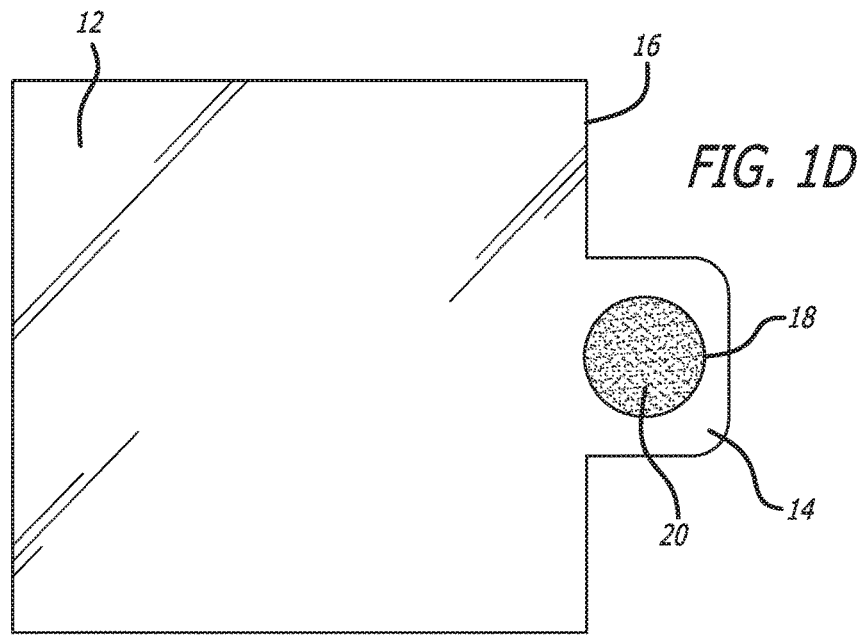
FIG. 1D is a top plan view of the first panel member of FIG. 1A showing the ball key inserted in a ball key slot of the first panel member.

Referring to the drawings, which are provided for purposes of illustration and by way of example, the present invention provides for interlocking panels, modules assembled with the interlocking panels, and a modular display case including an assembly of interlocking modules assembled with the interlocking panels, for use in displaying, transporting and storing objects such as models, display items or valuable collectibles, for example. The interlocking modules and modular display cases assembled from the interlocking panels of the present invention may be used as a modular stackable display system for storing, transporting or displaying valuable collectibles. The interlocking panels can be constructed of transparent, lightweight material, such as clear acrylic plastic, for example, to readily allow viewing of items placed within the interlocking modules and modular display cases, and the modularity of the interlocking modules and modular display cases permits the assembly of display and accessory boxes to create a variety of options for storing, transporting or displaying items.

The present invention provides for interlocking panels that utilize a unique locking system, using a plastic ball, such as a silicone rubber ball, for example, that can be inserted in and through the interlocking panels under compression to key a modified mortise and tenon joint, allowing for glueless constructions, and unassembled shipping of the interlocking panels. The present invention provides for a display base panel member allowing for cutouts of regular or custom shapes, such as circles, squares, rectangles, ovals, and the like; a magnetized and metal target system adhered to the base panel member of the display case to allow for secure attachment due to lateral motions during transportation or earthquakes; and modular organization inserts to further expand storage functions. The display system provided by the present invention allows for the storage and viewing of collectibles in a broad variety of modular and stackable options, thus creating an organized and expandable, fully scalable, stackable overall system with interchangeable parts. Optional accessory boxes of various sizes and dimensions, and optional organizers, such as spacers, dividers, and handles, for example, may also be provided.

Referring to the drawings, which are provided for purposes of illustration and by way of example, in a first presently preferred embodiment illustrated in FIGS. 1A to 1E, the present invention provides for a system for assembling a pair of interlocking panels 10, including a first panel member 12 including one or more generally rectangular side edge ball key or mortise or ball tabs 14 defined on a side edge 16 of the first panel member, each of the one or more ball key or mortise or ball tabs including a ball key or mortise or ball retaining aperture 18, which is preferably a circular aperture. Each ball key or mortise or ball retaining aperture preferably includes a ball key 20 that is removably received therein, as is shown more clearly in FIG. 1D.

The ball key is preferably a round, resilient, compressible ball, and most preferably is a spherical, resilient, compressible ball, typically formed of silicone rubber, for example. A silicone rubber ball key preferably has a Shore A hardness of about 60 to about 90, and most preferably has a Shore A hardness of about 70 to about 85. The low friction of the silicone rubber has been found to allow the ball key to slide into and be compressed, so as to be retained in the ball key or mortise or ball retaining aperture, even at a high shore hardness. The silicone rubber ball key preferably is dimensioned to be snugly press fit in the ball key or mortise or ball retaining aperture so that the ball key can be pressed into and out of the ball key or mortise or ball retaining aperture with a firm manual pressure, while being firmly retained in the ball key or mortise or ball retaining aperture during normal usage. The ball key typically has a cross-sectional diameter of approximately 5.5 mm, and the ball key or mortise or ball retaining aperture typically has a cross-sectional diameter that is correspondingly slightly less than the diameter of the ball key, such as approximately 5.0 mm or less, for example, so that the ball key is compressed, and to tightly hold and bite into a ball key when a ball key is pressed into the ball key or mortise or ball retaining aperture.

Figure 1E:
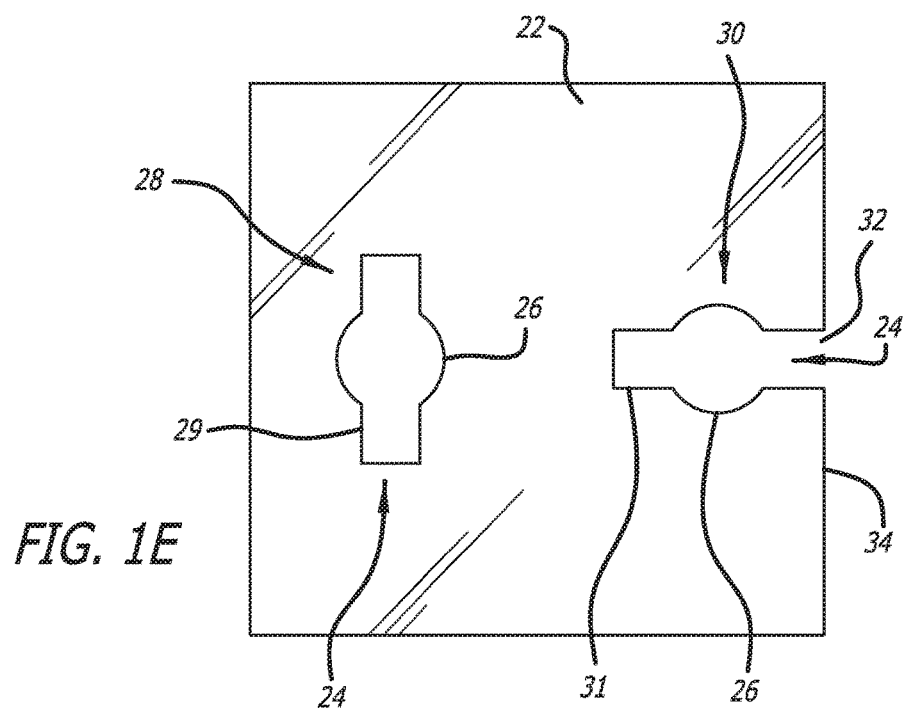
FIG. 1E is a top plan view of the second panel member of FIG. 1A.

A second panel member 22, seen most clearly in FIG. 1E, includes one or more generally rectangular ball key tab connecting ports or slots 24 extending through the second panel member for receiving the generally rectangular ball key or mortise or ball tab of the first panel member therein. Each generally rectangular ball key tab connecting port or slot preferably includes a middle portion with opposing curved outwardly directed interior edge portions 26 extending through an approximate middle portion of the generally rectangular ball key tab connecting port or slot with opposing curved outwardly directed interior edge portions for removably receiving the ball key therein. The middle portion of the generally rectangular ball key tab connecting port or slot of the second panel member preferably includes a middle portion with circularly curved outwardly directed interior edges, and typically has a cross-sectional diameter across the outwardly curved interior edges that is correspondingly slightly less than the diameter of the ball key, such as approximately 5.0 mm or less, for example, to block easy passage of the ball key therethrough, in order to firmly hold the joint formed by the first and second panels together. As is shown in FIG. 1E, the generally rectangular ball key tab connecting port or slot may be a mortise joint type connection port or slot 28, in which the generally rectangular ball key tab connecting port or slot extends through but is fully enclosed in or surrounded by the second panel member, and has contiguous rectangular interior side edges 29 joined with the curved interior side edges formed within the body of the second panel member, or may be a bridal joint type connection port or slot 30, in which the generally rectangular ball key tab connecting port or slot has rectangular interior side edges 31 joined with the curved interior side edges, but with an opening 32 at a side edge 34 of the second panel member.

Figure 2A:
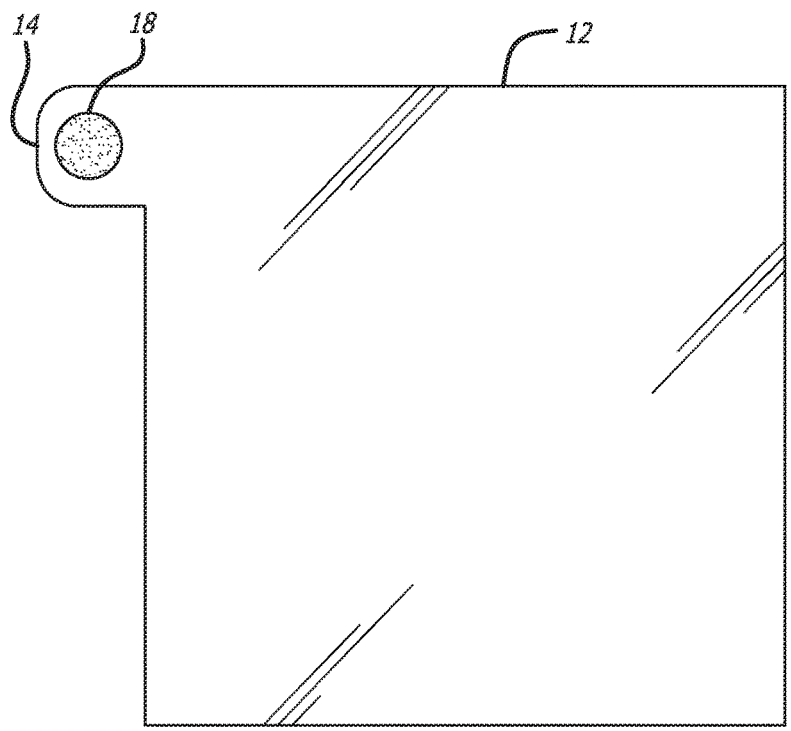
FIG. 2A is a side elevational view of a first panel member of pair of panels that can be assembled together to form a locking bridal joint, according to another presently preferred embodiment of the invention.
Figure 2B:
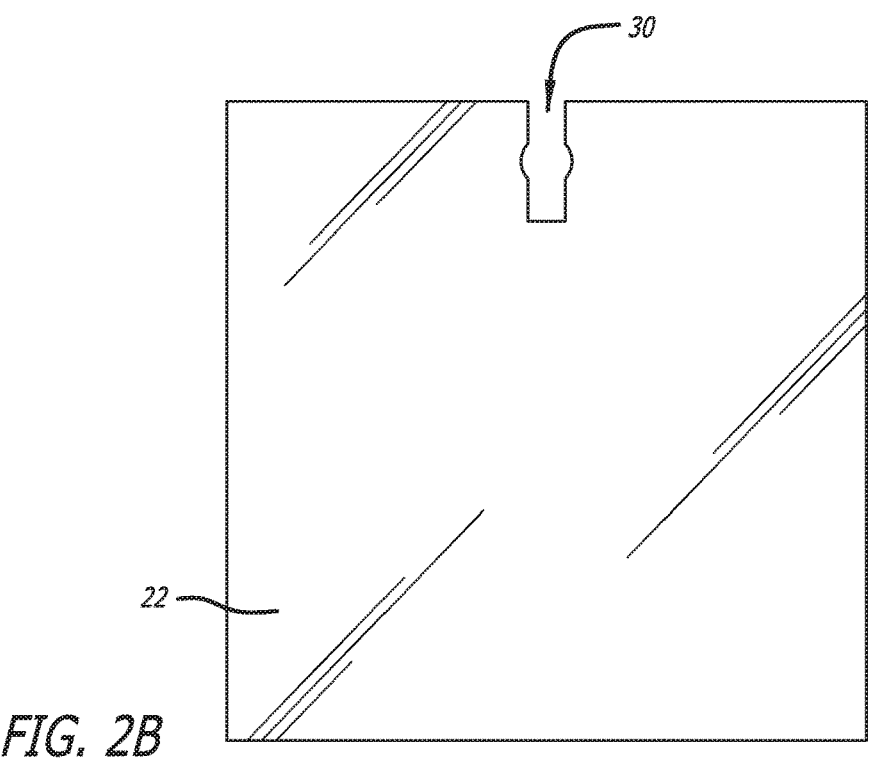
FIG. 2B is a side elevational view of a second panel member of pair of panels that can be assembled together with the panel member of FIG. 2A to form a locking bridal joint.
Figure 3:
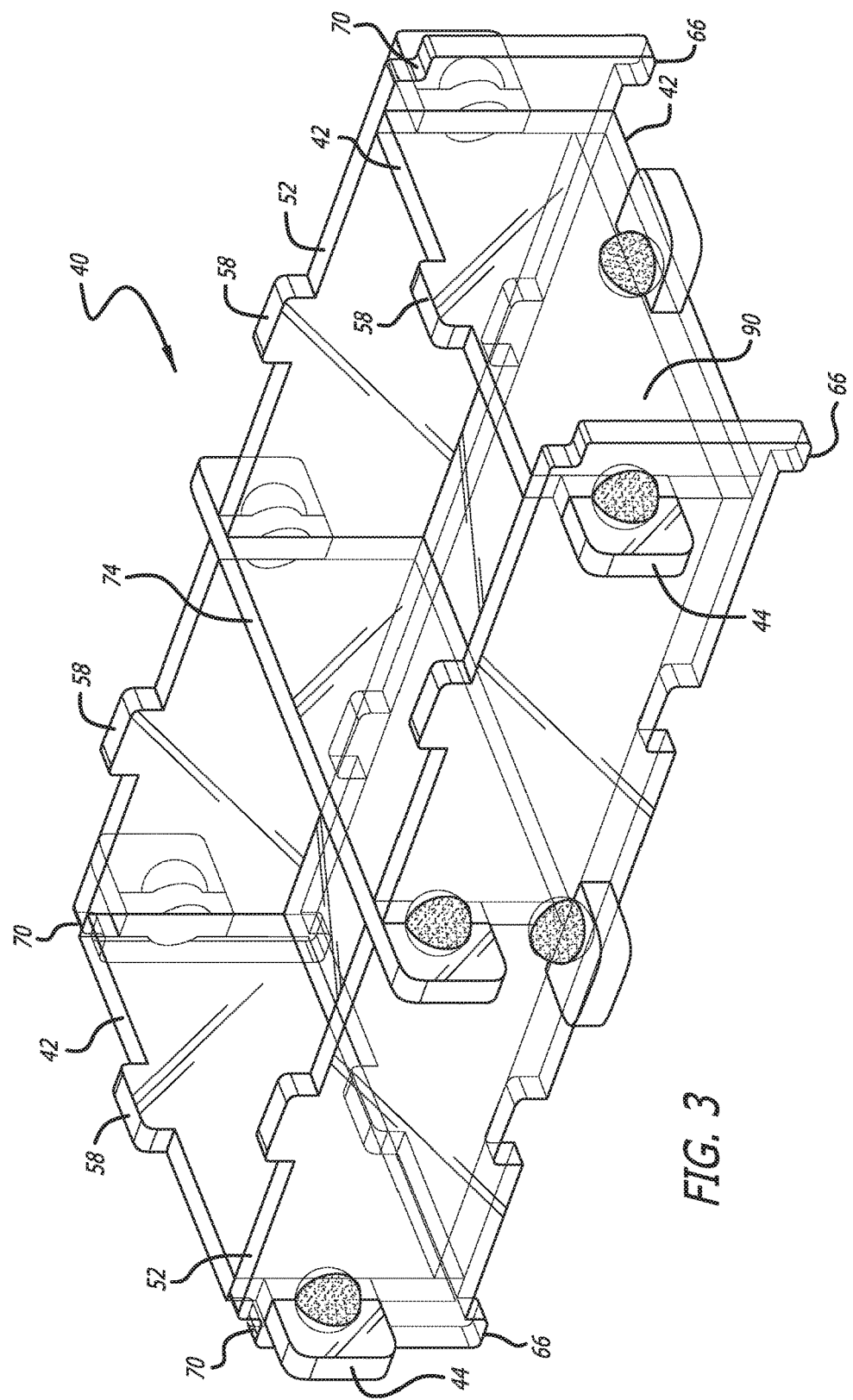
FIG. 3 is a perspective view of a basic one unit height rectangular accessory box module, according to another presently preferred embodiment of the invention.
Figure 4A:
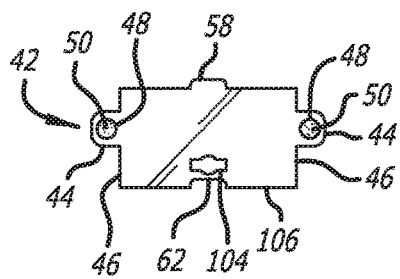
FIG. 4A is a plan view of a first sidewall panel member of a currently preferred variation of the basic one unit height rectangular accessory box module of FIG. 3.
Figure 4B:
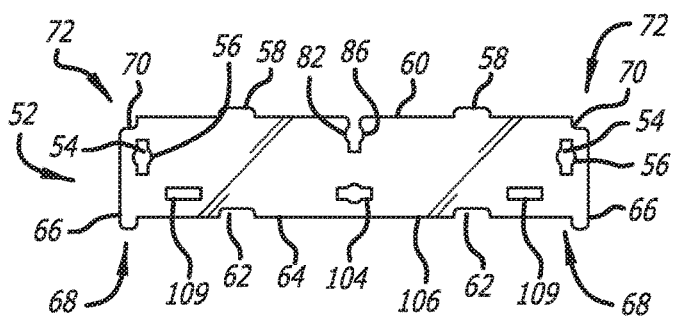
FIG. 4B is a plan view of a second sidewall panel member of the currently preferred variation of the basic one unit height rectangular accessory box module of FIG. 3.
Figure 4C:
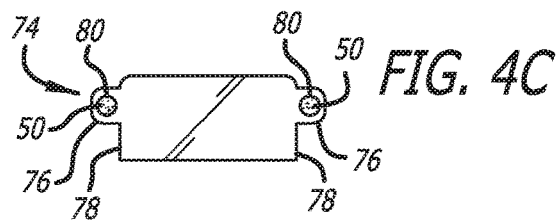
FIG. 4C is a plan view of a divider panel member of the currently preferred variation of the basic one unit height rectangular accessory box module of FIG. 3.
Figure 4E:
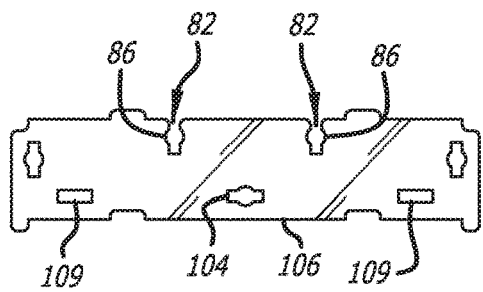
FIG. 4E is a side elevational view of a second sidewall panel member including two top locking joint or bridal joint slots allowing the basic one unit height rectangular accessory box module to be divided into three sections with two divider panel members.
Figure 4D:
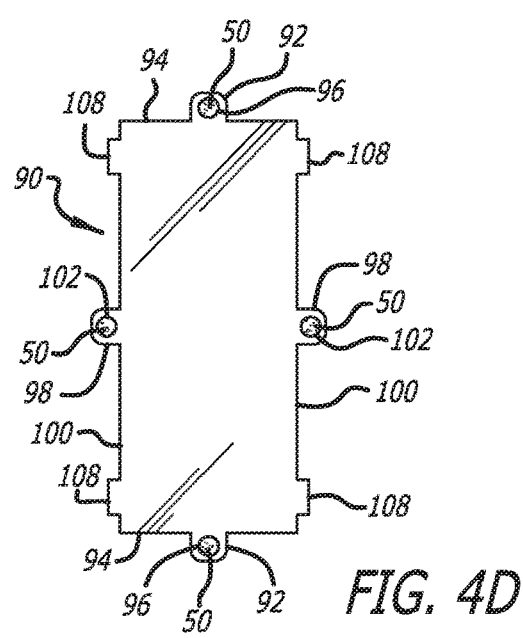
FIG. 4D is a plan view of a base horizontal panel member of the currently preferred variation of the basic one unit height rectangular accessory box module of FIG. 3.

Referring to FIGS. 2A and 2B, the bridal joint type connection port or slot may advantageously provide a locking type bridal joint connection, which is dimensioned to retain the ball key once it is inserted through the ball key tab connecting port or slot, and the ball key or mortise or ball retaining aperture of the ball key tab of the first panel member is positioned in the side edge ball key or mortise or ball tab a sufficient distance from the side edge of the first panel member, such as an extension of about 0.35 inches, for example, such that when the side edge ball key or mortise or ball tab is fully received in the corresponding generally rectangular ball key tab connecting port or slot of the second panel member, the first and second panel members are aligned orthogonally with respect to each other. While the ball key typically remains dimensioned to have a cross-sectional diameter of approximately 5.5 mm, the ball key is more tightly press compressed and retained in the ball key or mortise or ball retaining portion by reducing the cross-sectional diameter of the opposing outwardly curved edges of the middle ball key or mortise or ball retaining portion, such as to approximately 0.160 inch or 4.0 mm, and the middle ball key or mortise or ball retaining portion of the second panel member typically similarly has a cross-sectional diameter between the opposing outwardly curved interior edges that is approximately 0.160 inch or 4.0 mm, for example, so that the bridal joint connection formed can operate to interlock more strongly as a locking joint. The first and second panel members typically have a thickness of approximately 0.118 or ⅛ inch, or about 3.0 mm, for example, and preferably are formed from clear acrylic plastic material, but it should be recognized that sizes and dimensions of the panels, apertures and ball key retaining portions, as well as the ball key, can be adjusted depending upon the thickness of the panel members as well as the types of materials selected for making the panels and the ball keys.

In a presently preferred aspect, the present invention provides for modules assembled with the interlocking panels, and a modular display case including an assembly of interlocking modules assembled with the interlocking panels, for use in displaying, transporting and storing objects such as models, display items or valuable collectibles, for example.

Referring to FIGS. 3 and 4A to 4D, one example of one such module assembled with the interlocking panels is a basic rectangular accessory box 40, which is typically about 2 inches wide and about 4 inches long, and one common unit in height, such as about one inch, for example, although as will be explained below, modules may be multiples of the common unit in height. The currently preferred form of the basic rectangular accessory box includes a pair of generally rectangular, elongated first sidewall panel members 42, each including a pair of opposing side edge ball key or mortise or ball tabs 44 defined on opposing side edges 46 of the first sidewall panel members, and each of the side edge ball key or mortise or ball tabs including a ball key or mortise or ball retaining aperture 48. For a basic rectangular accessory box of two unit height, two pairs of opposing side edge ball key or mortise or ball tabs defined on the side edges of each first sidewall panel member. The ball key or mortise or ball retaining apertures are preferably circular, and each ball key or mortise or ball retaining aperture contains a ball key 50 removably retained in the ball key or mortise or ball retaining aperture. The ball key is typically a round, resilient, compressible ball, typically formed of silicone rubber, for example, as described above, and is preferably a spherical, resilient, compressible ball, that can be pressed into or out of the ball key or mortise or ball retaining aperture.

The basic rectangular accessory box also includes a pair of generally rectangular, elongated second sidewall panel members 52, each including a pair of opposing rectangular side edge ports or slots 54 for receiving a corresponding ball key or mortise or ball tab therein. Each of the pair of rectangular side edge ports or slots preferably includes a middle portion with opposing curved outwardly directed interior edge portions 56 extending through an approximate middle portion of the generally rectangular ball key tab connecting port or slot with opposing curved outwardly directed interior edge portions for removably receiving the ball key therein. For a basic rectangular accessory box of two unit height, each of the generally rectangular, elongated second sidewall panel members includes two pairs of opposing rectangular side edge ports or slots for receiving a ball key or mortise or ball tab. The middle ball key or mortise or ball retaining apertures in the generally rectangular, elongated second sidewall panel members are preferably circular.

For interlocking of vertically stacked modules, one or more accessory box stacking key tabs 58 are preferably provided in a top side 60 of each second sidewall panel member, and one or more accessory box stacking key slots 62 are provided in a bottom side 64 of each second sidewall panel member for receiving a corresponding accessory box stacking key tab. In addition, for additional stability of vertically stacked modules, one or more accessory box corner stacking key tabs 66 are preferably provided in a bottom side corner 68 of each second sidewall panel member, and one or more accessory box corner stacking key slots or notches 70 are provided in a top corner 72 of each second sidewall panel member for receiving a corresponding accessory box corner stacking key tab.

The basic rectangular accessory box also may optionally include one or more generally rectangular, elongated divider panel members 74, each preferably including a pair of side edge ball key or mortise or ball tabs 76 defined on the side edges 78 of the divider panel member, each of the side edge ball key or mortise or ball tabs including a ball key or mortise or ball retaining aperture 80 extending therethrough, and each ball key or mortise or ball retaining aperture including a ball key removably received therein. When one or more divider panel members are to be included, one or more corresponding top locking joint or bridal joint slots 82 are provided in the top side of each second sidewall panel member, each top locking joint or bridal joint slot defining an open ball key or mortise or ball retaining aperture 86 open at the top side of the second sidewall panel member and extending through the of the sidewall panel member for removably receiving a ball key of a corresponding divider panel member therein. When two divider panel members are to be included, two corresponding top locking joint or bridal joint slots are provided in the top side of each second sidewall panel member.

The basic rectangular accessory box also preferably includes a base horizontal panel member 90 including one or more pairs of side edge ball key or mortise or ball tabs 92 defined on opposing first side edges 94 of the base horizontal panel member, with a ball key or mortise or ball retaining aperture 96 extending therethrough, and each ball key or mortise or ball retaining aperture including a ball key removably received therein. The base horizontal panel member also preferably includes at least a second pair of side edge ball key or mortise or ball tabs 98 defined on opposing second side edges 100 of the base horizontal panel member, each including a ball key or mortise or ball connecting port or slot 102 extending therethrough, and each ball key or mortise or ball retaining aperture including a ball key removably received therein. Each of the first sidewall panel members preferably includes one or more side ball key or mortise or ball connecting ports or slots 104 extending through a bottom side portion 106 of the first sidewall panel member for removably receiving corresponding side edge ball key or mortise or ball tabs defined on the opposing first side edges of the base horizontal panel member. Each of the second sidewall panel members preferably includes one or more side ball key or mortise or ball connecting ports or slots 104 extending through the bottom side of the second sidewall panel member for removably receiving corresponding side edge ball key or mortise or ball tabs defined on the opposing second side edges of the base horizontal panel member therein.

The base horizontal panel member also preferably includes one or more pairs of opposing accessory box secondary, non-locking key tabs 108, typically not including a ball key or mortise or ball connecting port or slot and a ball key, defined on the opposing second side edges of the base horizontal panel member, each configured to be received in corresponding opposing one or more pairs of accessory box secondary, non-locking key slots 109, also typically not including a middle ball key or mortise or ball retaining aperture, defined in a bottom portion of each second sidewall panel member. The secondary, non-locking key tabs and corresponding secondary, non-locking key slots provide additional support and stability, increase rigidity and reduce rotational flexing of the modules.

During assembly of the basic one unit height rectangular accessory box into a module, ball keys preferably are inserted in the appropriate corresponding ball key retaining apertures of ball key tabs, spaced evenly within the ball key slots, the first and second sidewall panel members then are connected to the base horizontal panel member, the first and second sidewall panel members then are connected together, and finally divider panel members are added, as needed.

Figure 5:
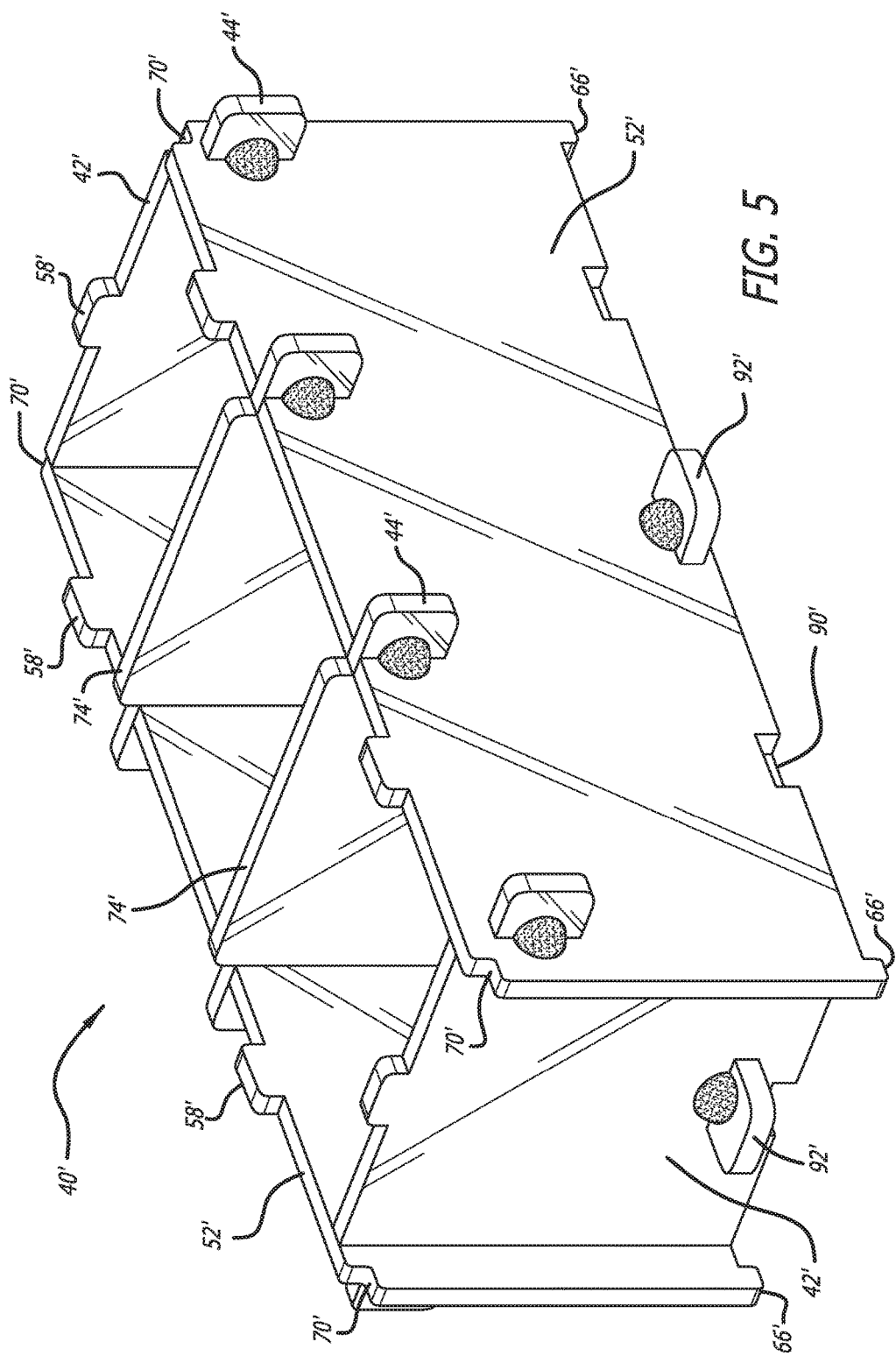
FIG. 5 is a perspective view of a basic two unit height rectangular accessory box module, according to another presently preferred embodiment of the invention.
Figure 6A:
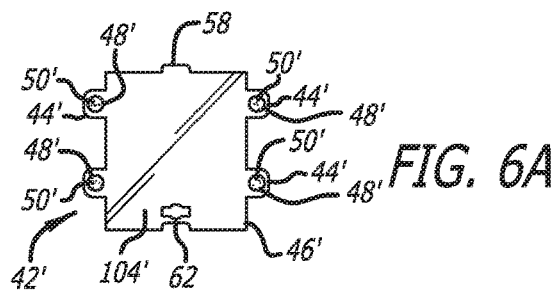
FIG. 6A is a plan view of a first sidewall panel member of a currently preferred variation of the basic two unit height rectangular accessory box module of FIG. 5.
Figure 6B:
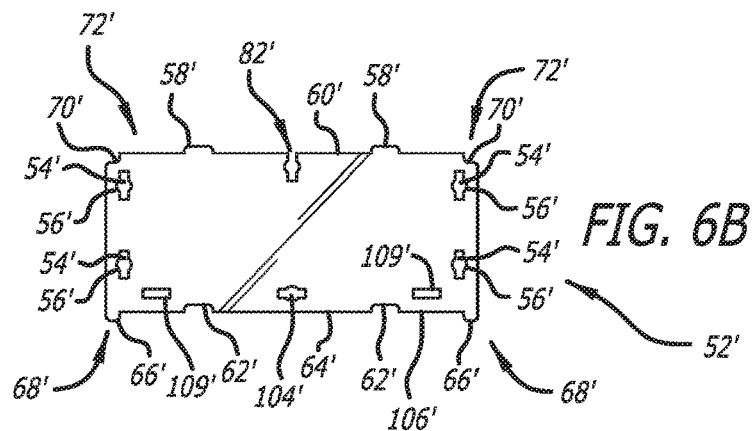
FIG. 6B is a plan view of a second sidewall panel member of the currently preferred variation of the basic two unit height rectangular accessory box module of FIG. 5.
Figure 6C:
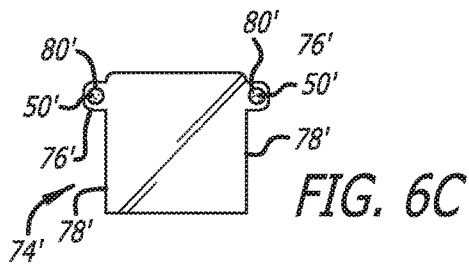
FIG. 6C is a plan view of a divider panel member of the currently preferred variation of the basic two unit height rectangular accessory box module of FIG. 5.
Figure 6E:
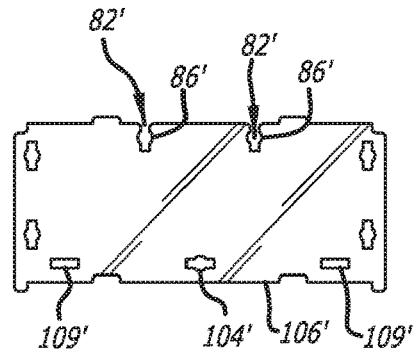
FIG. 6E is a side elevational view of another second sidewall panel member including two top locking joint or bridal joint slots allowing the basic two unit height rectangular accessory box module to be divided into three sections with two divider panel members.
Figure 6D:
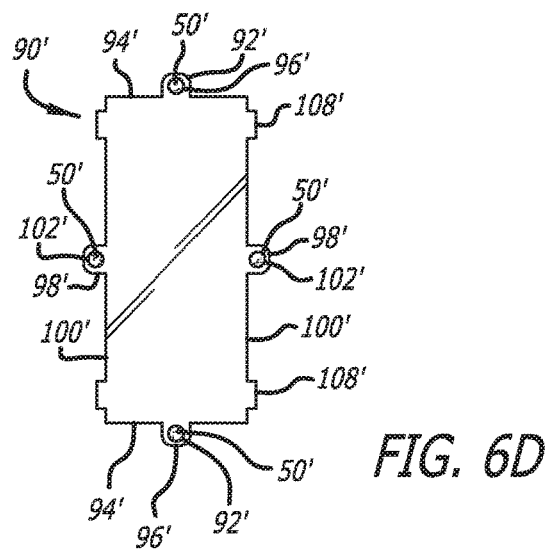
FIG. 6D is a plan view of a base horizontal panel member of the currently preferred variation of the basic two unit height rectangular accessory box module of FIG. 5.

Referring to FIGS. 5 and 6A to 6D, another example of a module assembled with the interlocking panels is a basic two unit height rectangular accessory box 40', which is also typically about 2 inches wide and about 4 inches long, but two common units in height, such as about two inches in height, for example. The currently preferred form of the basic two unit height rectangular accessory box includes a pair of generally rectangular, elongated first sidewall panel members 42', each including 2 pairs of opposing side edge ball key or mortise or ball tabs 44' defined on the side edges 46' of the sidewall panel members, and each of the side edge ball key or mortise or ball tabs including a ball key or mortise or ball retaining aperture 48'. Although the panel members are preferably transparent, the module is shown in FIG. 5 as not transparent, for simplicity. The ball key or mortise or ball retaining apertures are preferably circular, and each ball key or mortise or ball retaining aperture contains a ball key 50' removably retained in the ball key or mortise or ball retaining aperture. The ball key is typically a round, resilient, compressible ball, typically formed of silicone rubber, for example, as described above, and is preferably a spherical, resilient, compressible ball, that can be pressed into or out of the ball key or mortise or ball retaining aperture.

The basic two unit height rectangular accessory box also includes a pair of generally rectangular, elongated 2 unit second sidewall panel members 52', each of the second sidewall panel members including 2 pairs of opposing rectangular side edge ports or slots 54' for receiving a corresponding ball key or mortise or ball tab therein, each of the pair of rectangular side edge ports or slots including middle portion with opposing curved outwardly directed interior edge portions 56' extending through an approximate middle portion of the generally rectangular ball key tab connecting port or slot with opposing curved outwardly directed interior edge portions for removably receiving the ball key therein. The middle portions of the generally rectangular ball key tab connecting ports or slots of the second sidewall panel member preferably include a middle portion with circularly curved outwardly directed interior edges.

For interlocking of vertically stacked modules, one or more accessory box stacking key tabs 58' are preferably provided in a top side 60' of each second sidewall panel member, and one or more accessory box stacking key slots 62' are provided in a bottom side 64' of each second sidewall panel member for receiving a corresponding accessory box stacking key tab. In addition, for additional stability of vertically stacked modules, one or more accessory box corner stacking key tabs 66' are preferably provided in a bottom side corner 68' of each second sidewall panel member, and one or more accessory box corner stacking key slots or notches 70' are provided in a top corner 72' of each second sidewall panel member for receiving a corresponding accessory box corner stacking key tab.

The basic two unit height rectangular accessory box also may include one or more generally rectangular, two unit elongated divider panel members 74', each preferably including a pair of side edge ball key or mortise or ball tabs 76' defined on the side edges 78' of each divider panel member, each of the side edge ball key or mortise or ball tabs including a ball key or mortise or ball retaining aperture 80' extending therethrough, and each ball key or mortise or ball retaining aperture including a ball key removably received therein.

When one or more divider panel members are to be included, one or more corresponding top locking joint or bridal joint slots 82' are provided in the top side of each second sidewall panel member, each top locking joint or bridal joint slot defining an open ball key or mortise or ball retaining aperture 86' open at the top side of the second sidewall panel member and extending through the top side of the sidewall panel member for removably receiving a ball key of a corresponding divider panel member therein. When two divider panel members are to be included, two corresponding top locking joint or bridal joint slots are provided in the top side of each second sidewall panel member.

The basic two unit height rectangular accessory box also preferably includes a base horizontal panel member 90' including one or more pair of side edge ball key or mortise or ball tabs 92' defined on opposing first side edges 94' of the base horizontal panel member, each of the side edge ball key or mortise or ball tabs including a ball key or mortise or ball retaining aperture 96' extending therethrough, and each ball key or mortise or ball retaining aperture including a ball key removably received therein. The base horizontal panel member also preferably includes at least a second pair of side edge ball key or mortise or ball tabs 98' defined on opposing second side edges 100' of the base horizontal panel member, each of the side edge ball key or mortise or ball tabs including a ball key or mortise or ball retaining aperture 102' extending therethrough, and each ball key or mortise or ball retaining aperture including a ball key removably received therein. Each of the first sidewall panel members preferably includes one or more side edge ball key or mortise or ball connecting ports or slots 104' extending through a bottom side edge 106' of the first sidewall panel member for removably receiving a corresponding one of the one or more pair of side edge ball key or mortise or ball tabs defined on the opposing first side edges of the base horizontal panel member therein. Each of the second sidewall panel members preferably includes one or more side ball key or mortise or ball connecting ports or slots 104' extending through the bottom side of the second sidewall panel member for removably receiving a corresponding one of the side edge ball key or mortise or ball tabs defined on the opposing second side edges of the base horizontal panel member therein.

The base horizontal panel member includes one or more pairs of opposing accessory box secondary, non-locking key tabs 108', typically not including a ball key or mortise or ball connecting port or slot and a ball key, defined on the opposing second side edges of the base horizontal panel member, configured to be received in corresponding accessory box secondary, non-locking key slots 109', also typically not including a middle ball key or mortise or ball retaining aperture, defined in a bottom portion of each second sidewall panel member. The secondary, non-locking key tabs and corresponding secondary, non-locking key slots provide additional support and stability, increase rigidity and reduce rotational flexing of the modules.

During assembly of the basic two unit height rectangular accessory box into a module, ball keys preferably are inserted in the appropriate corresponding ball key retaining apertures of ball key tabs, spaced evenly within the ball key slots, the first and second sidewall panel members then are connected to the base horizontal panel member, the first and second sidewall panel members then are connected together, and finally divider panel members are added, as needed.

Figure 7:
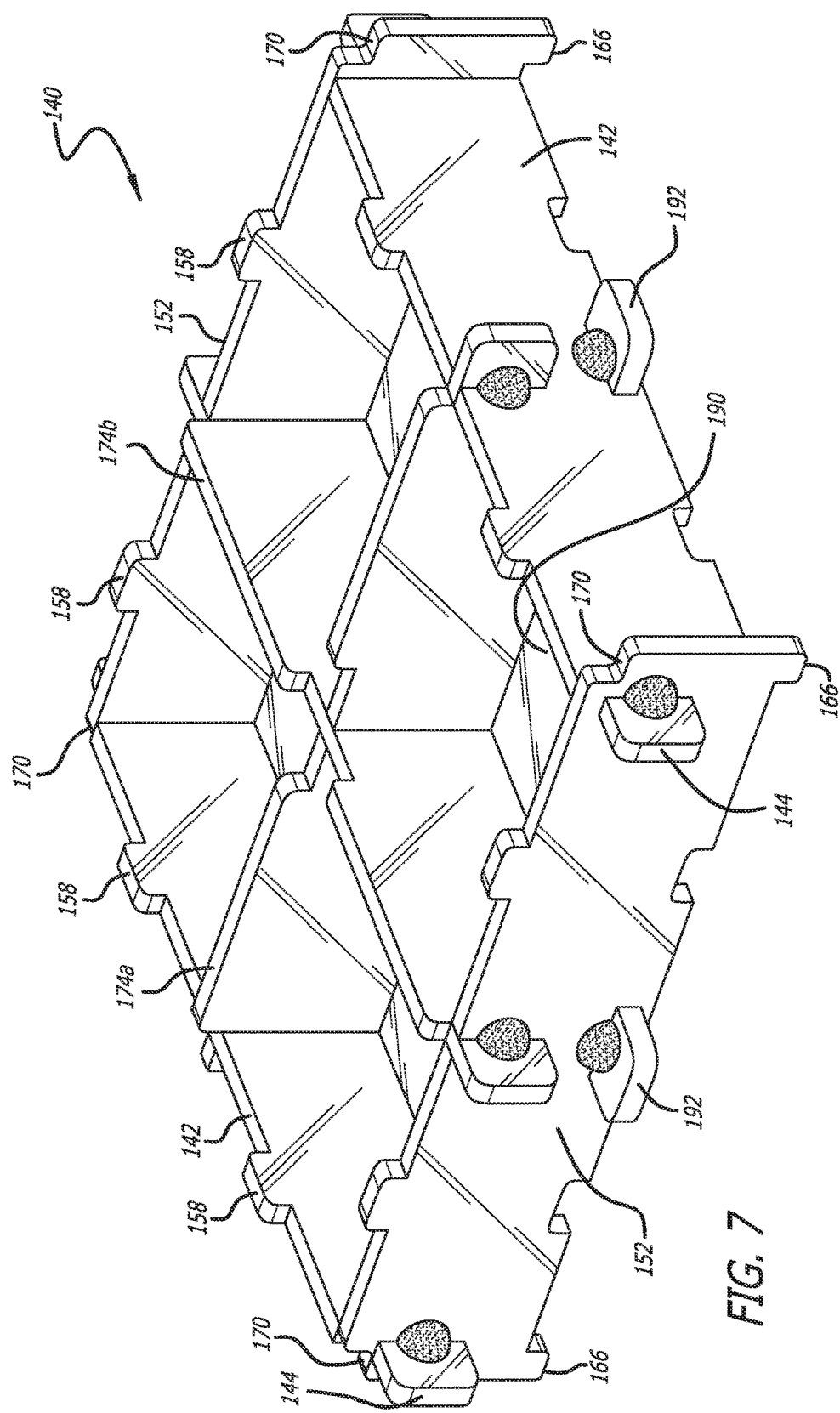
FIG. 7 is a perspective view of a square accessory box module, according to another presently preferred embodiment of the invention.

Referring to FIGS. 7 and 8A to 8E, another example of a module assembled with the interlocking panels is a square accessory box 140, which is typically about 4 inches wide and about 4 inches long, and one common unit in height, such as about one inch in height, for example, although square modules also may be multiples of the common unit in height. The currently preferred form of the square accessory box includes a pair of generally rectangular, elongated first sidewall panel members 142, each including a pair of opposing side edge ball key or mortise or ball tabs 144 defined on the side edges 146 of the first sidewall panel members, each of the side edge ball key or mortise or ball tabs including a ball key or mortise or ball retaining aperture 148. Although the panel members are preferably transparent, the module is shown in FIG. 7 as not transparent, for simplicity. The ball key or mortise or ball retaining apertures are preferably circular, and each ball key or mortise or ball retaining aperture contains a ball key 150 removably retained in the ball key or mortise or ball retaining aperture. The ball key is typically a round, resilient, compressible ball, typically formed of silicone rubber, for example, as described above, and is preferably a spherical, resilient, compressible ball, that can be pressed into or out of the ball key or mortise or ball retaining aperture.

The square accessory box also includes a pair of generally rectangular, elongated second sidewall panel members 152, each of the second sidewall panel members including a pair of opposing rectangular side edge ports or slots 154 for receiving a ball key or mortise or ball tab therein, each of the pair of rectangular side edge ports or slots including a middle portion with opposing curved outwardly directed interior edge portions 156 extending through an approximate middle portion of the generally rectangular ball key tab connecting port or slot with opposing curved outwardly directed interior edge portions for removably receiving the ball key therein. The middle portions of the generally rectangular ball key tab connecting ports or slots of the second sidewall panel member preferably include a middle portion with circularly curved outwardly directed interior edges.

For interlocking of vertically stacked modules, one or more accessory box stacking key tabs 158 are preferably provided in a top side 160 of each second sidewall panel member, and preferably two accessory box stacking key tabs are provided in the top side of each second sidewall panel member. One or more corresponding accessory box stacking key slots 162, preferably two, are preferably provided in a bottom side 164 of each second sidewall panel member for receiving the corresponding one or more accessory box stacking key tabs. The square accessory box also includes one or more accessory box corner stacking key tabs 166 in a bottom side corner 168 of each second sidewall panel member, and one or more corresponding accessory box corner stacking key slots 170 in a top corner 172 of each second sidewall panel member for receiving a corresponding accessory box corner stacking key tab.

The square accessory box also may optionally include one or more generally rectangular, elongated divider panel members 174, and typically includes a generally rectangular, elongated bottom divider panel member 174a and a generally rectangular, elongated top divider panel member 174b that interfits with the bottom divider panel member. The generally rectangular, elongated top divider panel member includes a downwardly facing divider slot 175b in a lower edge 177 of the top divider panel member, configured to fit over a top bridal joint slot or locking top bridal joint 175a in a top side 173 of the bottom divider panel member and to receive a portion of the bottom divider panel member therein. Each divider panel member also preferably includes a pair of side edge ball key or mortise or ball tabs 176 defined on the side edges 178 of each divider panel member, with each of the side edge ball key or mortise or ball tabs including a ball key or mortise or ball retaining aperture 180 extending therethrough, and a ball key removably received therein.

Figure 8A:
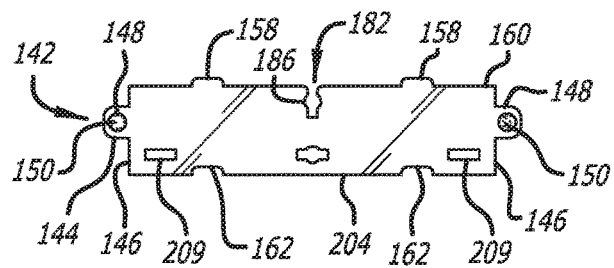
FIG. 8A is a plan view of a first sidewall panel member of a currently preferred variation of the square accessory box module of FIG. 7.
Figure 8B:
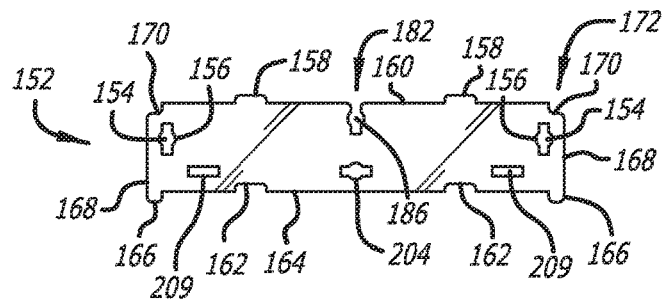
FIG. 8B is a plan view of a second sidewall panel member of the currently preferred variation of the basic two unit height rectangular accessory box module of FIG. 7.
Figure 8C:
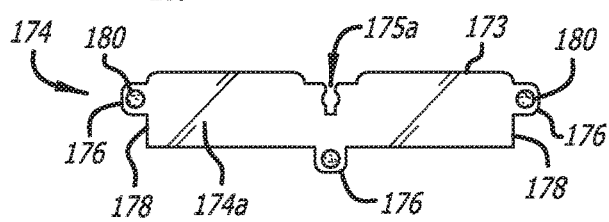
FIG. 8C is a plan view of a first divider panel member of the currently preferred variation of the basic two unit height rectangular accessory box module of FIG. 7.
Figure 8D:
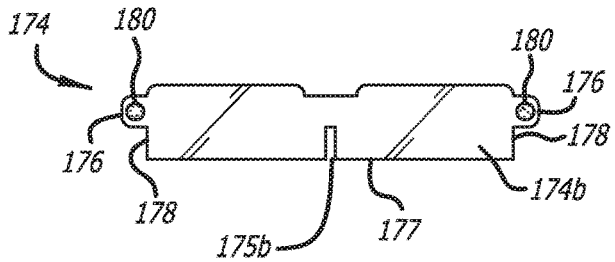
FIG. 8D is a plan view of a second divider panel member of the currently preferred variation of the basic two unit height rectangular accessory box module of FIG. 7.
Figure 8E:
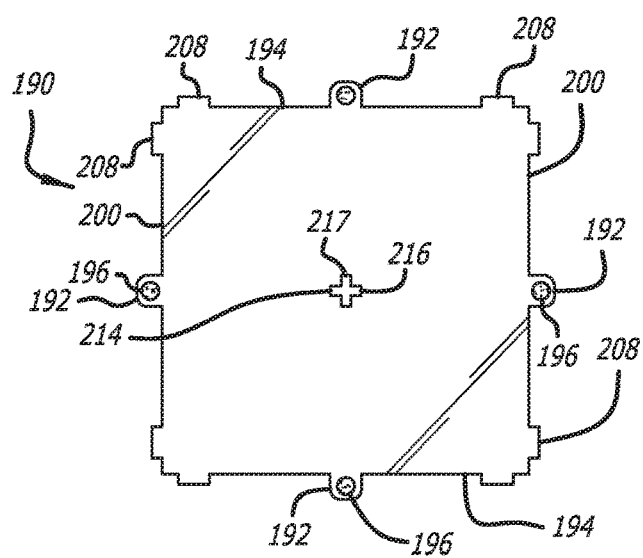
FIG. 8E is a plan view of a base horizontal panel member of the currently preferred variation of the basic two unit height rectangular accessory box module of FIG. 7.
Figure 8F:
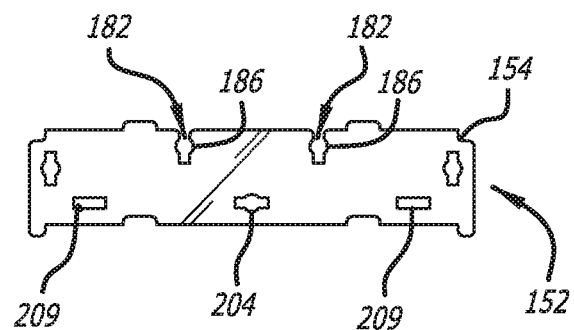
FIG. 8F is a side elevational view of a second sidewall panel member including two top locking joint or bridal joint slots allowing the square accessory box module to be divided into three sections with two divider panel members.
Figure 8G:
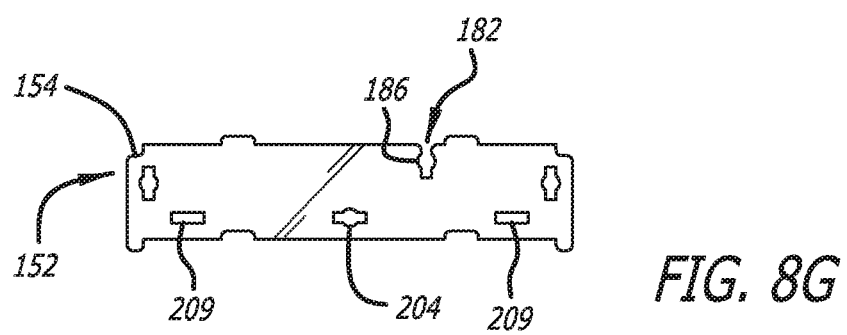
FIG. 8G is a side elevational view of a second sidewall panel member including a single off-center top locking joint or bridal joint slot allowing the square accessory box module to be divided into two sections with one divider panel member.

As is illustrated in FIGS. 8A, 8B, 8F and 8G, one or more top locking joint or bridal joint slots 182 are preferably provided in the top side of each of the first and second sidewall panel members, with each top locking joint or bridal joint slot defining an open ball key or mortise or ball retaining aperture 186 open at the top side of the first and second sidewall panel members and extending through the top side edge of each sidewall panel member for removably receiving a ball key of a corresponding divider panel member therein. As shown in FIGS. 8F and 8I, two top locking joint or bridal joint slots may be provided in the top side of each second sidewall panel member for receiving two smaller corresponding generally rectangular, elongated divider panel members 174c such as those described above for the basic rectangular accessory box, each preferably including a pair of side edge ball key or mortise or ball tabs 176 defined on the side edges 178 of the divider panel member, each of the side edge ball key or mortise or ball tabs including a ball key or mortise or ball retaining aperture 180 extending therethrough, and each ball key or mortise or ball retaining aperture including a ball key removably received therein.

Referring to FIG. 8E, the currently preferred form of the square accessory box also preferably includes a generally square base horizontal panel member 190 including one or more pairs of side edge ball key or mortise or ball tabs 192 defined on opposing first side edges 194 of the base horizontal panel member, each of the side edge ball key or mortise or ball tabs including a ball key or mortise or ball retaining aperture 196 extending therethrough, and each ball key or mortise or ball retaining aperture including a ball key removably received therein. The base horizontal panel member includes at least second pair of side edge ball key or mortise or ball tabs defined on opposing second side edges 200 of the base horizontal panel member, each of the side edge ball key or mortise or ball tabs including a ball key or mortise or ball retaining aperture extending therethrough, and each ball key or mortise or ball retaining aperture including a ball key removably received therein. Each of the first and second sidewall panel members preferably includes one or more side edge ball key or mortise or ball connecting ports or slots 204 near the bottom side edge of each sidewall panel member for removably receiving a corresponding one of the one or more pair of side edge ball key or mortise or ball tabs defined on the opposing first and second side edges of the base horizontal panel member therein.

Figure 8H:
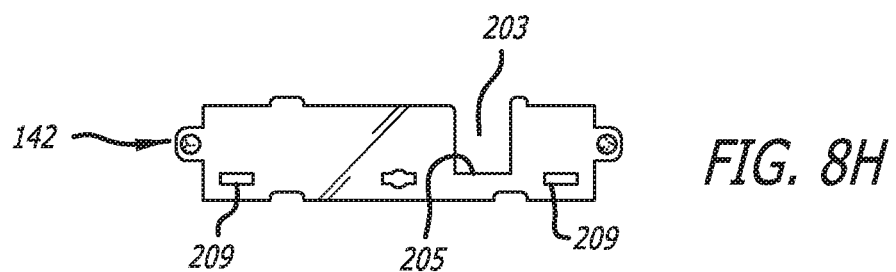
FIG. 8H is a side elevational view of a second sidewall panel member for the square accessory box module including a card lift slot.
Figure 8I:
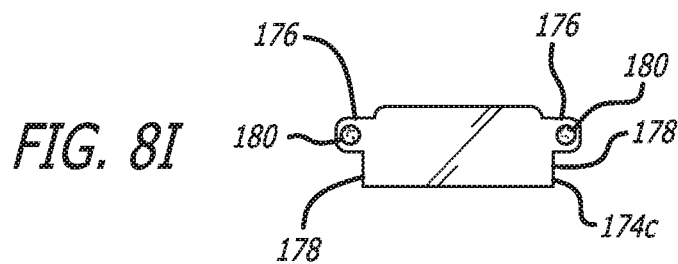
FIG. 8I is a side elevational view of a divider panel member for the square accessory box module.
Figure 8J:
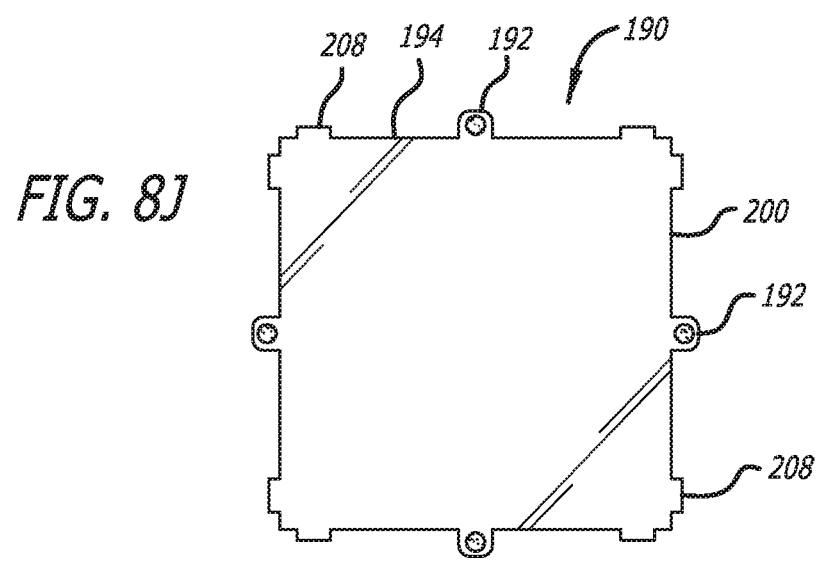
FIG. 8J is a top plan view of an alternate base horizontal panel member for the square accessory box module.
Figure 8K:
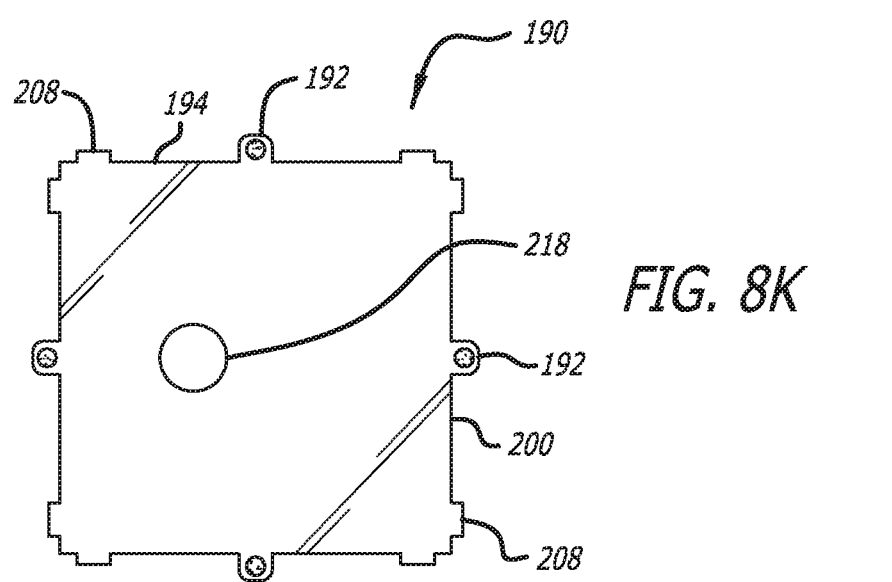
FIG. 8K is a top plan view of another alternate base horizontal panel member including a card lift slot for the square accessory box module.
Figure 9:
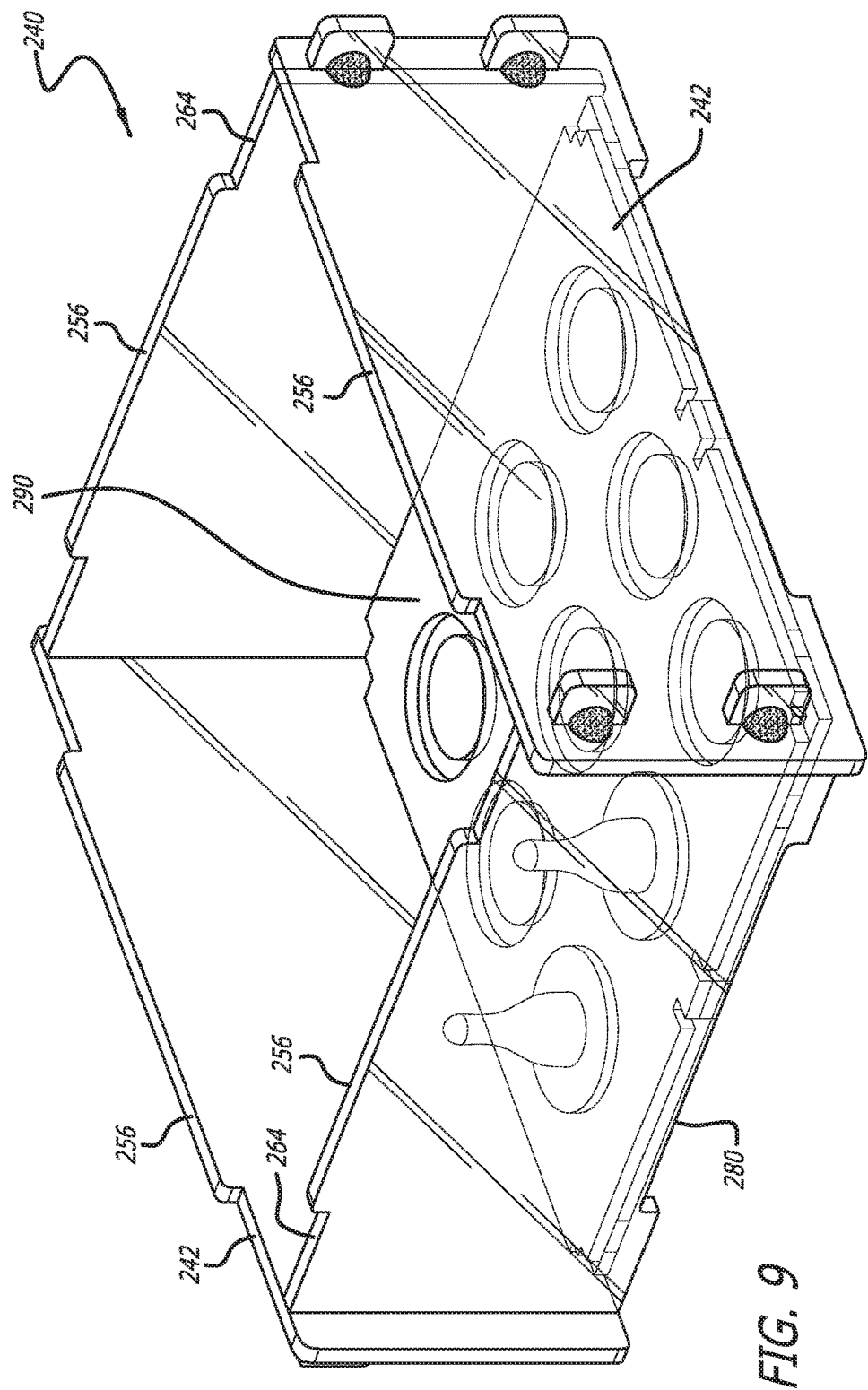
FIG. 9 is a perspective view of a square display case module, according to another presently preferred embodiment of the invention.
Figure 10A:
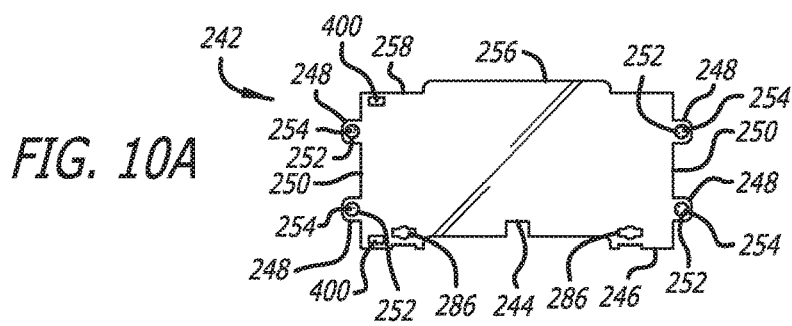
FIG. 10A is a plan view of a first sidewall panel member of a currently preferred variation of the square display case module of FIG. 9.
Figure 10B:
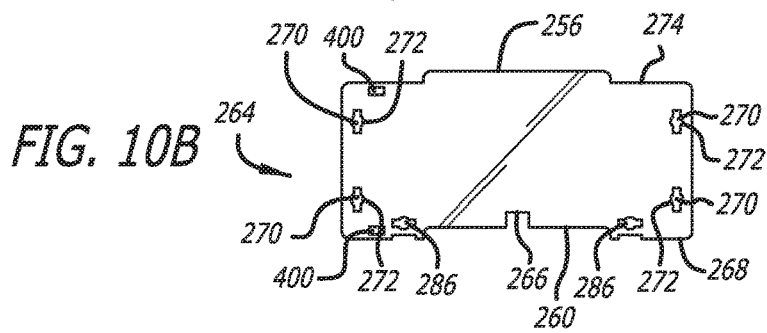
FIG. 10B is a plan view of a second sidewall panel member of the currently preferred variation of the square display case module of FIG. 9.
Figure 10C:
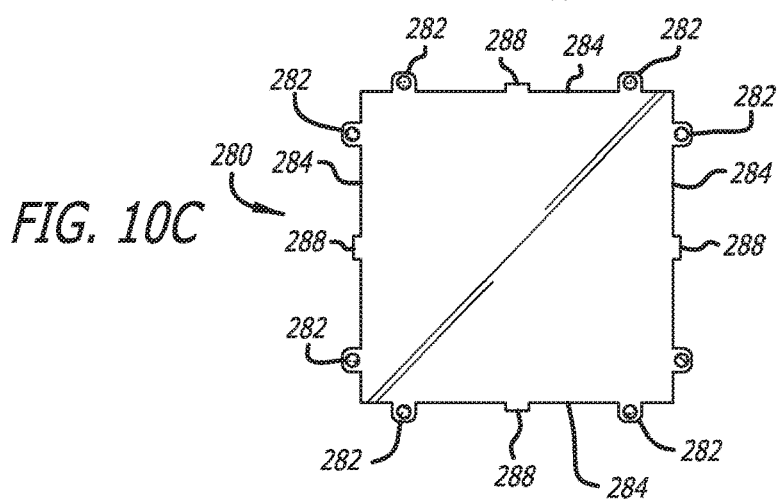
FIG. 10C is a plan view of a base horizontal panel member of the currently preferred variation of the square display case module of FIG. 9.
Figure 10D:
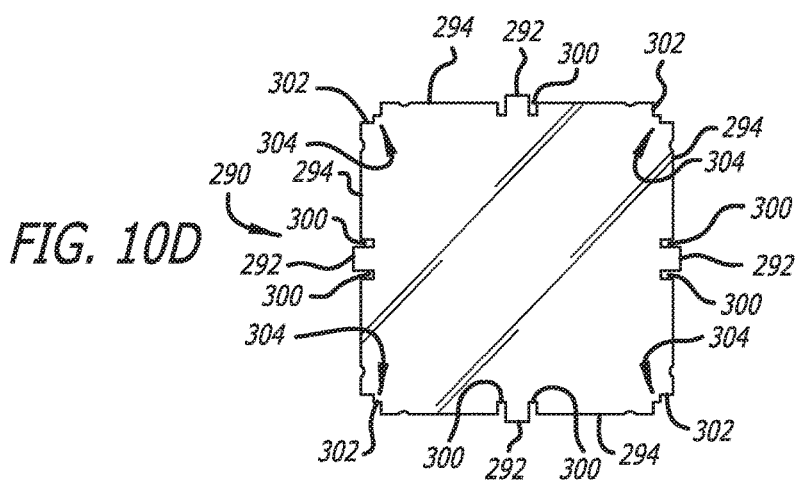
FIG. 10D is a plan view of a layout panel member of the currently preferred variation of the square display case module of FIG. 9.
Figure 10E:
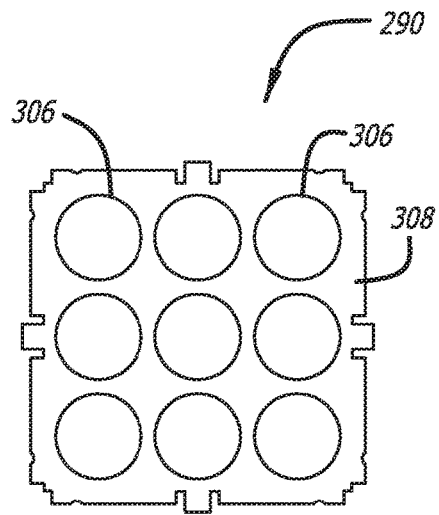
FIG. 10E is a top plan view of an alternate layout panel member for the square display case module of FIGS. 10A to 10D.
Figure 10F:
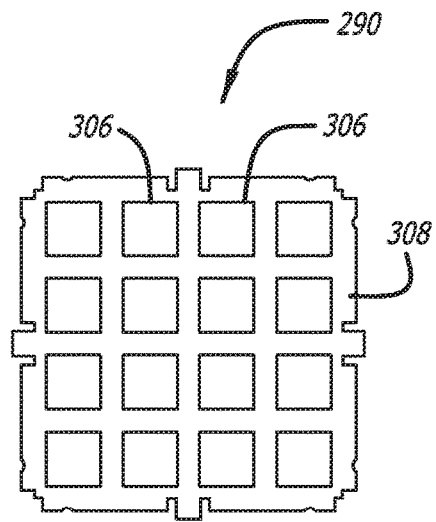
FIG. 10G is a top plan view of another alternate layout panel member for the square display case module of FIGS. 10A to 10D.
FIG. 10H is a top plan view of another alternate layout panel member for the square display case module of FIGS. 10A to 10D.
Figure 10G:
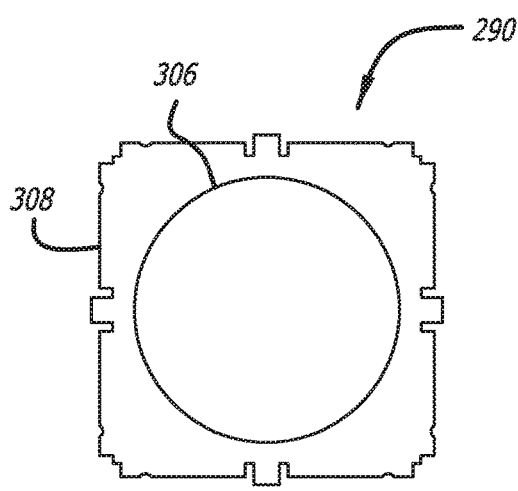
Figure 10H:
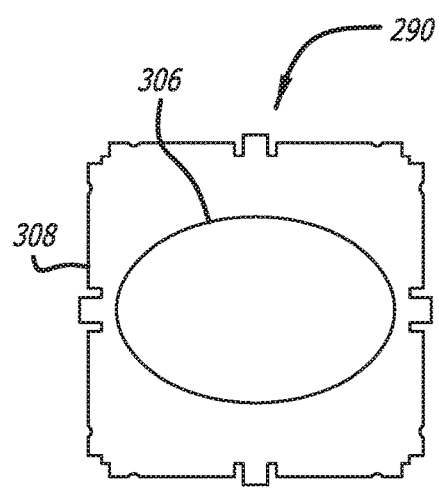

As is illustrated in FIG. 8H, each of the pair of generally rectangular, elongated first sidewall panel members may optionally include a card lift slot 203 extending from a top side opening of the first sidewall panel members through the pair of generally rectangular, elongated first sidewall panel members and downwardly to an inner edge 205, typically aligned with the one or more side edge ball key or mortise or ball retaining apertures.

The base horizontal panel member also preferably includes one or more pairs of opposing secondary, non-locking key tabs 208 defined on the opposing first and second side edges of the base horizontal panel members, respectively. The one or more pairs of opposing secondary, non-locking key tabs are each configured to be received in the corresponding one or more secondary, non-locking key slots 209 in a bottom portion of each of the first and second sidewall panel members. The secondary, non-locking key tabs and corresponding secondary, non-locking key slots provide additional support and stability, increase rigidity and reduce rotational flexing of the modules.

As shown in FIG. 8E, when intersecting top and bottom divider panels are provided, the base horizontal panel member also preferably includes a divider dual slot 214 provided in the middle of the base horizontal panel member, defined by a first rectangular slot 216 parallel to the opposing first side edges, and a second rectangular slot 217 parallel to the opposing second side edges, the first and second rectangular slots intersecting in the middle of the base horizontal panel member, for receiving a bottom side ball key or mortise or ball tab 176 on the bottom side of the bottom divider panel member.

When the first sidewall panel members include a card lift slot, the base horizontal panel member also preferably includes a corresponding card lift slot 218 extending through the base horizontal panel member. The card lift slot in the base horizontal panel member preferably is round, or circular, although the card lift slot in the base horizontal panel member may alternatively be another suitable shape, such as rectangular, for example. The card lift slots allow a user to more easily access cards placed in the section of the square accessory box including the card lift slots, such as for storage or use during a game, for example.

The basic one unit height square accessory box may be assembled into a module as a quad bay square accessory box, or a large card square accessory box, for example. During assembly of either the quad bay square accessory box or the large card square accessory box into a module, ball keys preferably are inserted in the appropriate corresponding ball key retaining apertures of ball key tabs, spaced evenly within the ball key slots, the first and second sidewall panel members then are connected to the base horizontal panel member, the first and second sidewall panel members then are connected together. For the quad bay square accessory box, finally divider panel members are added, as needed; however, for the large card square accessory box, typically no divider panel members are added.

Referring to FIGS. 9 and 10A to 10D, another example of a module assembled with the interlocking panels is a square display case 240, which is typically about 5 inches wide and about 5 inches long, and two common units in height, such as about two inches in height, for example, also the display case module may be other multiples of the common unit in height. The currently preferred form of the square display case includes a pair of generally rectangular, elongated first sidewall panel members 242, each including a bottom edge slot 244 in the middle of a lower side edge 246 configured to receive a layout panel member secondary, non-locking key tab and a base horizontal panel member secondary, non-locking key tab, as will be described below, and each including 2 pairs of opposing side edge ball key or mortise or ball tabs 248 defined on the side edges 250 of the first sidewall panel members, and each of the side edge ball key or mortise or ball tabs including a ball key or mortise or ball retaining aperture 252. The ball key or mortise or ball retaining apertures are preferably circular, and each ball key or mortise or ball retaining aperture contains a ball key 254 removably retained in the ball key or mortise or ball retaining aperture. The ball key is typically a round, resilient, compressible ball, typically formed of silicone rubber, for example, as described above, and is preferably a spherical, resilient, compressible ball, that can be pressed into or out of the ball key or mortise or ball retaining aperture.

For interlocking of vertically stacked modules, the sidewall panel members also preferably include one or more display stacking key tabs 256 in a top side 258 of the sidewall panel members, and one or more display stacking key slots 260 in the bottom side of the sidewall panel members for receiving a corresponding stacking key tab of another similar module, respectively.

The square display case also includes a pair of generally rectangular, elongated second sidewall panel members 264, each including a middle slot 266 in the middle of a lower side edge 268 configured to receive a layout panel member secondary, non-locking key tab, described below, and a base horizontal panel member secondary, non-locking key tab, also described below. Each of the second sidewall panel members also includes two pairs of opposing rectangular side edge ports or slots 270 for receiving a ball key or mortise or ball tab therein, each of the pair of rectangular side edge ports or slots including a middle portion with opposing curved outwardly directed interior edge portions 272 extending through an approximate middle portion of the generally rectangular ball key tab connecting ports or slots with opposing curved outwardly directed interior edge portions for removably receiving the ball key therein. The middle portions of the generally rectangular ball key tab connecting ports or slots of the second sidewall panel member preferably include a middle portion with circularly curved outwardly directed interior edges. For interlocking of vertically stacked modules, each of the second sidewall panel members also preferably includes one or more display stacking key tabs 256 in a top side 274 of the second sidewall panel members, and one or more display stacking key slots 260 in the bottom side 268 of the second sidewall panel members for receiving a corresponding stacking key tab of another similar module, respectively.

The square display case also includes a base horizontal panel member 280 including first and second pairs of side edge ball key or mortise or ball tabs 282 defined on opposing first and second side edges 284 of the base horizontal panel member, each of the side edge ball key or mortise or ball tabs including a ball key or mortise or ball retaining aperture extending therethrough, each of the ball key or mortise or ball retaining apertures including a ball key removably received therein.

Each of the first and second sidewall panel members includes a pair of bottom side edge ball key or mortise or ball connecting ports or slots 286 near the bottom side edge of each first sidewall panel member for removably receiving the corresponding first and second pairs of side edge ball key or mortise or ball tabs defined on the opposing first side edges of the base horizontal panel member therein, and each of the second sidewall panel members includes a pair of side edge ball key or mortise or ball connecting ports or slots extending through a bottom side edge of each second sidewall panel member for removably receiving the corresponding first and second pairs of side edge ball key or mortise or ball tabs defined on the opposing second side edges of the base horizontal panel member therein.

The base horizontal panel member also preferably includes first and second pairs of opposing display case secondary, non-locking key tabs 288 defined on the opposing first and second side edges of the base horizontal panel member, respectively, configured to be received in the corresponding bottom side edge slots 244 and 266 in the lower edges of each of the first and second sidewall panel members. The secondary, non-locking key tabs and corresponding bottom side edge slots provide additional support and stability, increase rigidity and reduce rotational flexing of the modules.

The square display case also includes a layout panel member 290 including first and second pairs of side edge key tabs 292 defined on opposing first and second side edges 294 of the layout panel member, and pairs of side edge key slots 300 on either side of each of the side edge key tabs, and first and second corner key slots 302 defined at the corners 304 of each layout panel member for receiving an accessory box. As shown in FIGS. 10E, 10F, 10G and 10H, the layout panel member may optionally include one or more recesses 306 in a top side 308 of the layout panel member for receiving one or more bases of display items. The one or more recesses may be square, round, such as circular or oval, or other suitable shapes for receiving a similarly shaped base of a display item. The one or more recesses may also include magnetized target members affixed in the one or more recesses. The magnetized target members may for example be composite vinyl and metal materials, including a ferromagnetic metal, such as a vinyl metal composite including iron filings, for example, such as are available from 3M, to provide targets for receiving magnetized bases of display items, that fit on or in the targets on the layout panel member, allowing the module containing the display items with magnetized bases placed on the targets to be turned upside down without displacing the display items.

During assembly of basic two unit height square display case into a module, ball keys preferably are inserted in the appropriate corresponding ball key retaining apertures of ball key tabs, spaced evenly within the ball key slots, and one of the sidewall panel members is then connected to the base horizontal panel member. The layout panel member then is lined up on top of the base horizontal panel member, and then is connected to the sidewall panel member connected to the base horizontal panel member. The other of the sidewall panel members then is connected to the base horizontal panel member and the layout panel member, and finally the first and second sidewall panel members are connected together to finish the assembly.

Figure 11:
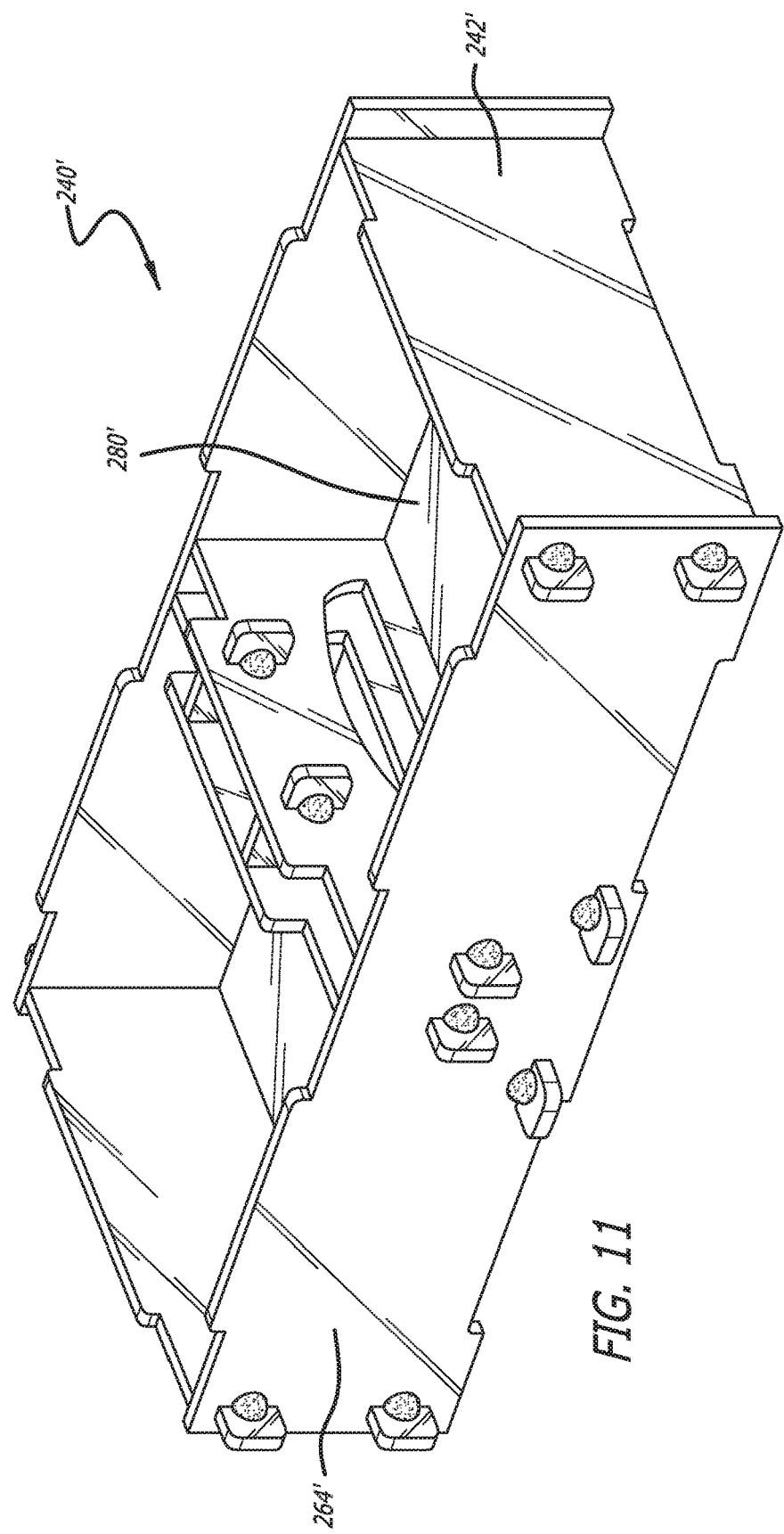
FIG. 11 is a perspective view of a larger rectangular display case module, according to another presently preferred embodiment of the invention.

Referring to FIGS. 11 and 12A to 12E, another example of a module assembled with the interlocking panels is a larger rectangular display case 240', which is typically about 5 inches wide and about 10 inches long, and two common units in height, such as about two inches in height, for example, also the display case module may be other multiples of the common unit in height. In a currently preferred variation, the rectangular display case includes a pair of generally rectangular, elongated first sidewall panel members 242' each including a slot 244' in the middle of a lower side edge 246' configured to receive a layout panel member secondary, non-locking key tab and a base horizontal panel member secondary, non-locking key tab, described below, and each including 2 pairs of opposing side edge ball key or mortise or ball tabs 248' defined on the side edges 250' of the first sidewall panel members, each of the side edge ball key or mortise or ball tabs including a ball key or mortise or ball retaining aperture 252'. Although the panel members are preferably transparent, the module is shown in FIG. 11 as not transparent, for simplicity. The ball key or mortise or ball retaining apertures are preferably circular, and each ball key or mortise or ball retaining aperture contains a ball key 254' removably retained in the ball key or mortise or ball retaining aperture. The ball key is typically a round, resilient, compressible ball, typically formed of silicone rubber, for example, as described above, and is preferably a spherical, resilient, compressible ball, that can be pressed into or out of the ball key or mortise or ball retaining aperture.

For interlocking of vertically stacked modules, the first sidewall panel members also preferably include one or more display stacking key tabs 256' in a top side 258' of the first sidewall panel members, and one or more display stacking key slots 260' in the bottom side of the first sidewall panel members for receiving a corresponding stacking key tab, respectively.

The rectangular display case also includes a pair of generally rectangular, elongated second sidewall panel members 264', each including first and second slots 266' in a lower side edge 268' each configured to receive a layout panel member secondary, non-locking key tab, described below, and a base horizontal panel member secondary, non-locking key tab, also described below. Each of the second sidewall panel members also includes two pairs of opposing rectangular side edge ports or slots 270' for receiving a ball key or mortise or ball tab therein, each of the pair of rectangular side edge ports or slots including a middle portion with opposing curved outwardly directed interior edge portions 272' extending through an approximate middle portion of the generally rectangular ball key tab connecting port or slot with opposing curved outwardly directed interior edge portions for removably receiving the ball key therein. The middle portions of the generally rectangular ball key tab connecting ports or slots of the second sidewall panel member preferably include a middle portion with circularly curved outwardly directed interior edges. For interlocking of vertically stacked modules, each of the second sidewall panel members also preferably includes one or more display stacking key tabs 256' in a top side 274' of the second sidewall panel members, and one or more display stacking key slots 260' in the bottom side edge of the second sidewall panel members for receiving a corresponding accessory box stacking key tab.

The rectangular display case also includes a base horizontal panel member 280' including first and second pairs of side edge ball key or mortise or ball tabs 282' defined on opposing first and second side edges 284' of the base horizontal panel member, each of the side edge ball key or mortise or ball tabs including a ball key or mortise or ball retaining aperture extending therethrough, each of the ball key or mortise or ball retaining apertures including a ball key removably received therein.

Each of the first and second sidewall panel members includes a pair of bottom side edge ball key or mortise or ball connecting ports or slots 286' near the bottom side edge of each first sidewall panel member for removably receiving the corresponding first and second pairs of side edge ball key or mortise or ball tabs defined on the opposing first side edges of the base horizontal panel member therein, and each of the second sidewall panel members includes a pair of side edge ball key or mortise or ball connecting ports or slots extending through a bottom side edge of each second sidewall panel member for removably receiving the corresponding first and second pairs of side edge ball key or mortise or ball tabs defined on the opposing second side edges of the base horizontal panel member therein.

The base horizontal panel member also preferably includes first and second pairs of opposing display case secondary, non-locking key tabs 288' defined on the opposing first and second side edges of the base horizontal panel member, respectively, configured to be received in corresponding one or more secondary, non-locking key slots 244', 266' in the bottom portion of the first and second sidewall panel members, and in one or more non-locking key slots 289' in the bottom portion of the second sidewall panel members. The secondary, non-locking key tabs and corresponding secondary, non-locking key slots provide additional support and stability, increase rigidity and reduce rotational flexing of the modules.

The rectangular display case also includes a square layout panel member 290' including first and second pairs of side edge key tabs 292' defined on opposing first and second side edges 294' of the layout panel member, pairs of side edge key slots 300' on the either side of the side edge key tabs, and first and second corner key slots 302' defined on corners 304' of the layout panel member for receiving an accessory box.

The layout panel member may optionally include one or more recesses 306' in a top side 308' of the layout panel member for receiving one or more bases of display items. As shown in FIGS. 12F to 12I, the one or more recesses may be square, round, such as circular or oval, or other suitable shapes for receiving a similarly shaped base of a display item. The one or more recesses may also include magnetized target members affixed in the one or more recesses. The magnetized target members may for example be composite vinyl and metal materials, including a ferromagnetic metal, such as a vinyl metal composite including iron filings, for example, such as are available from 3M, to provide targets for receiving magnetized bases of display items, that fit on or in the targets on the layout panel member, allowing the module containing the display items with magnetized bases placed on the targets to be turned upside down without displacing the display items.

Figure 12A:
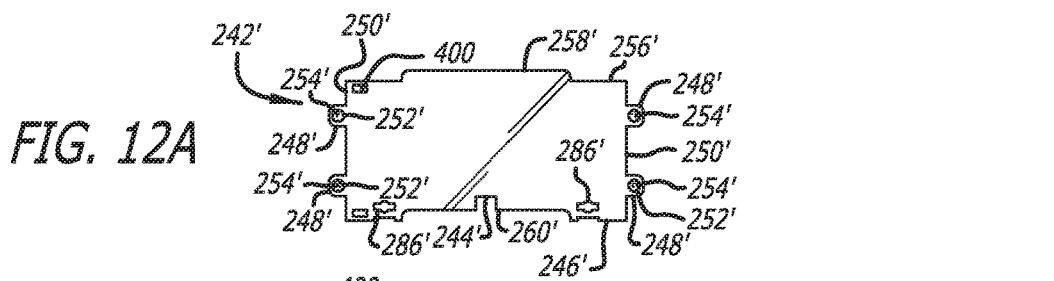
FIG. 12A is a plan view of a first sidewall panel member of a currently preferred variation of the larger rectangular display case module of FIG. 11.
Figure 12B:
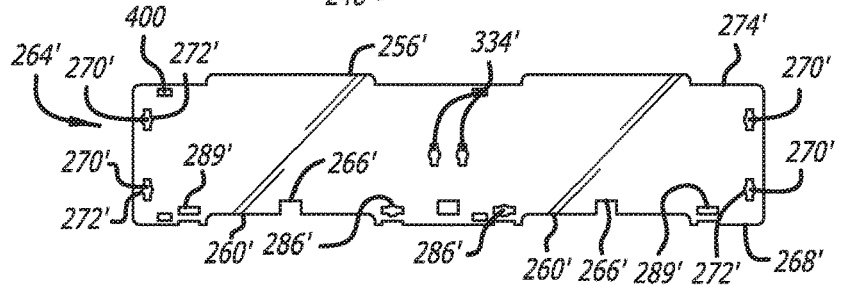
FIG. 12B is a plan view of a second sidewall panel member of the currently preferred variation of the larger rectangular display case module of FIG. 11.
Figure 12C:
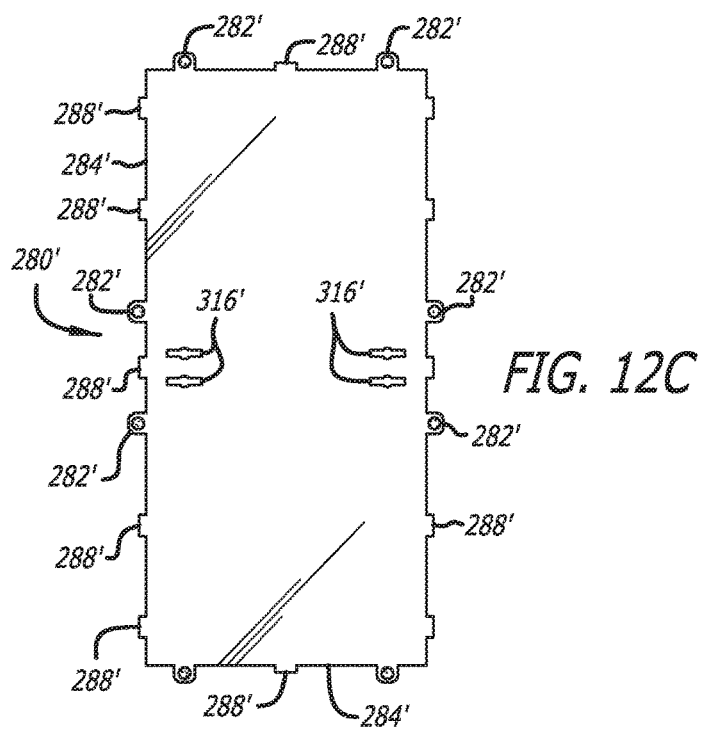
FIG. 12C is a plan view of a base horizontal panel member of the currently preferred variation of the larger rectangular display case module of FIG. 11.
Figure 12D:
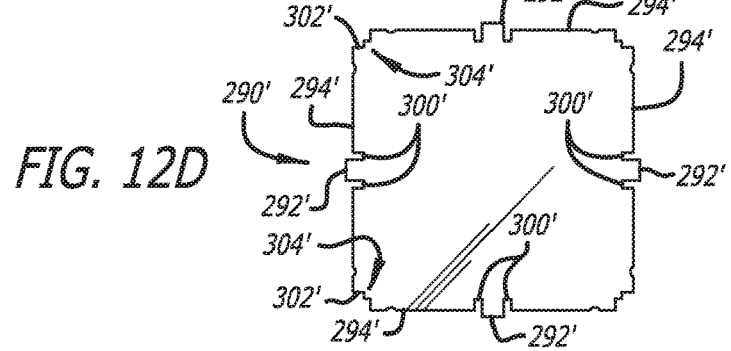
FIG. 12D is a plan view of a square layout panel member of the currently preferred variation of the larger rectangular display case module of FIG. 11.
Figure 12E:
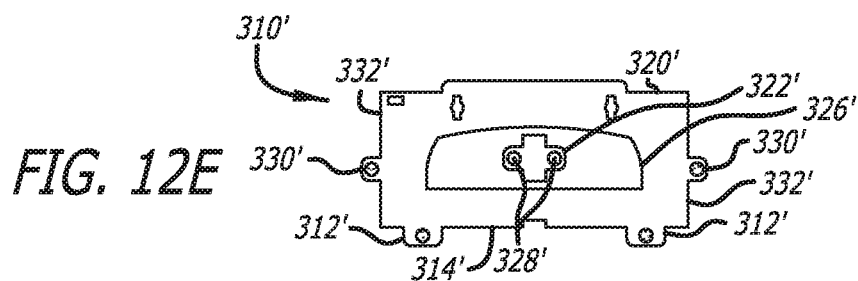
FIG. 12E is a plan view of a handle panel member of the currently preferred variation of the larger rectangular display case module of FIG. 11.
Figure 12F:
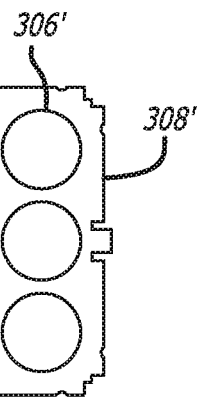
FIG. 12F is a top plan view of an alternate layout panel member base for the currently preferred variation of the larger rectangular display case module of FIGS. 12A to 12E.
Figure 12G:
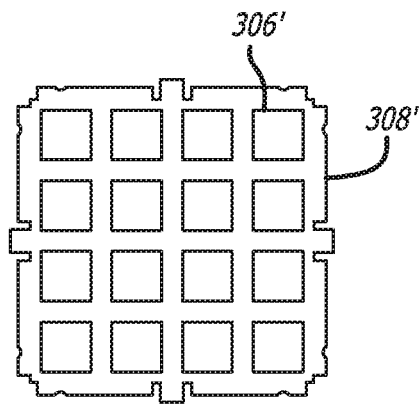
FIG. 12G is a top plan view of another alternate layout panel member for the currently preferred variation of the larger rectangular display case module of FIGS. 12A to 12E.
Figure 12H:
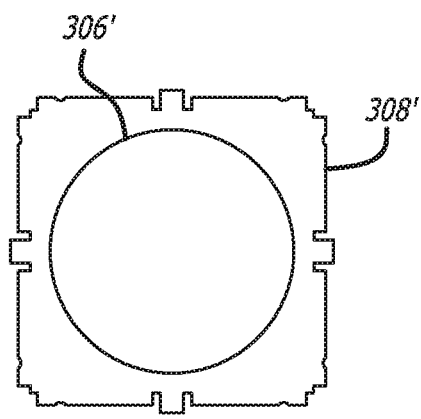
FIG. 12H is a top plan view of another alternate layout panel member for the currently preferred variation of the larger rectangular display case module of FIGS. 12A to 12E.
Figure 12I:
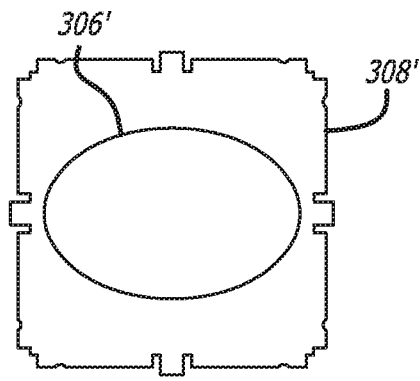
FIG. 12I is a top plan view of another alternate layout panel member for the currently preferred variation of the larger rectangular display case module of FIGS. 12A to 12E.
Figure 12J:
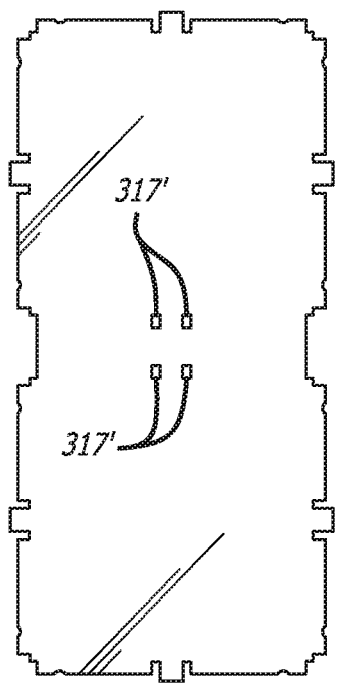
FIG. 12J is a top plan view of an alternate base horizontal panel member the currently preferred variation of the larger rectangular display case module of FIGS. 12A to 12E.
Figure 12K:
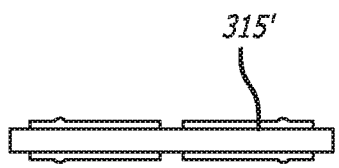
FIG. 12K is a top plan view of a layer lock panel member for the currently preferred variation of the larger rectangular display case module of FIGS. 12A to 12E.

The currently preferred form of the rectangular display case also preferably includes identical first and second handle panel members 310' (only one of which is shown), each including a pair of bottom edge ball key or mortise or ball tabs 312' defined on bottom edges 314' of the handle panel members, and each of the side edge ball key or mortise or ball tabs includes a ball key or mortise or ball retaining aperture, with a ball key removably retained in the ball key or mortise or ball retaining aperture. As shown in FIG. 12K, instead of two handle panel members, a layer lock panel member 315' alternatively may be installed between layout panel members. The base horizontal panel member preferably includes two pairs of opposing rectangular bottom edge ports or slots 316' for receiving corresponding ones of the handle panel member bottom edge ball key or mortise or ball tabs therein, each of the pair of rectangular bottom edge ports or slots including a middle portion with opposing curved outwardly directed interior edge portions extending through an approximate middle portion of the generally rectangular ball key tab connecting port or slot with opposing curved outwardly directed interior edge portions for removably receiving the ball key therein. Alternatively, as shown in FIG. 12J, the base horizontal panel member may include key slots 317' for receiving bottom corner tabs of accessory boxes. Each of the first and second handle panel members preferably also includes a top edge handle tab 318' on a top edge 320'. First and second handle locking spacers 322' (only one of which is shown) are configured to be connected between opposing vertically oriented rectangular top edge ports or slots 324' of the first and second handle panel members, respectively. The first and second handle locking spacers are typically cut from of a middle section removed from the first and second handle panel members leaving middle openings 326'. The first and second handle locking spacers each include opposing ball key or mortise or ball tabs 328' defined on opposing side edges of the handle locking spacers, and are connected between the opposing rectangular top edge ports or slots of the first and second handle panel members, respectively, to hold the two handle panel members apart. The first and second handle locking spacers also include side edge tabs 330' on edges 332', and the second sidewall panels include corresponding slots 334' for receiving the side edge tabs of the first and second handle locking spacers.

During assembly of the larger two unit height square display case into a module, ball keys preferably are inserted in the appropriate corresponding ball key retaining apertures of ball key tabs, spaced evenly within the ball key slots, and both of the sidewall panel members then are connected to the base horizontal panel member. The layout panel member then is lined up on top of the base horizontal panel member, and then is connected to both of the sidewall panel members. The handle locking spacers are preferably inserted into the handle panel members, and finally the first and second sidewall panel members are connected together to finish the assembly.

Figure 13:
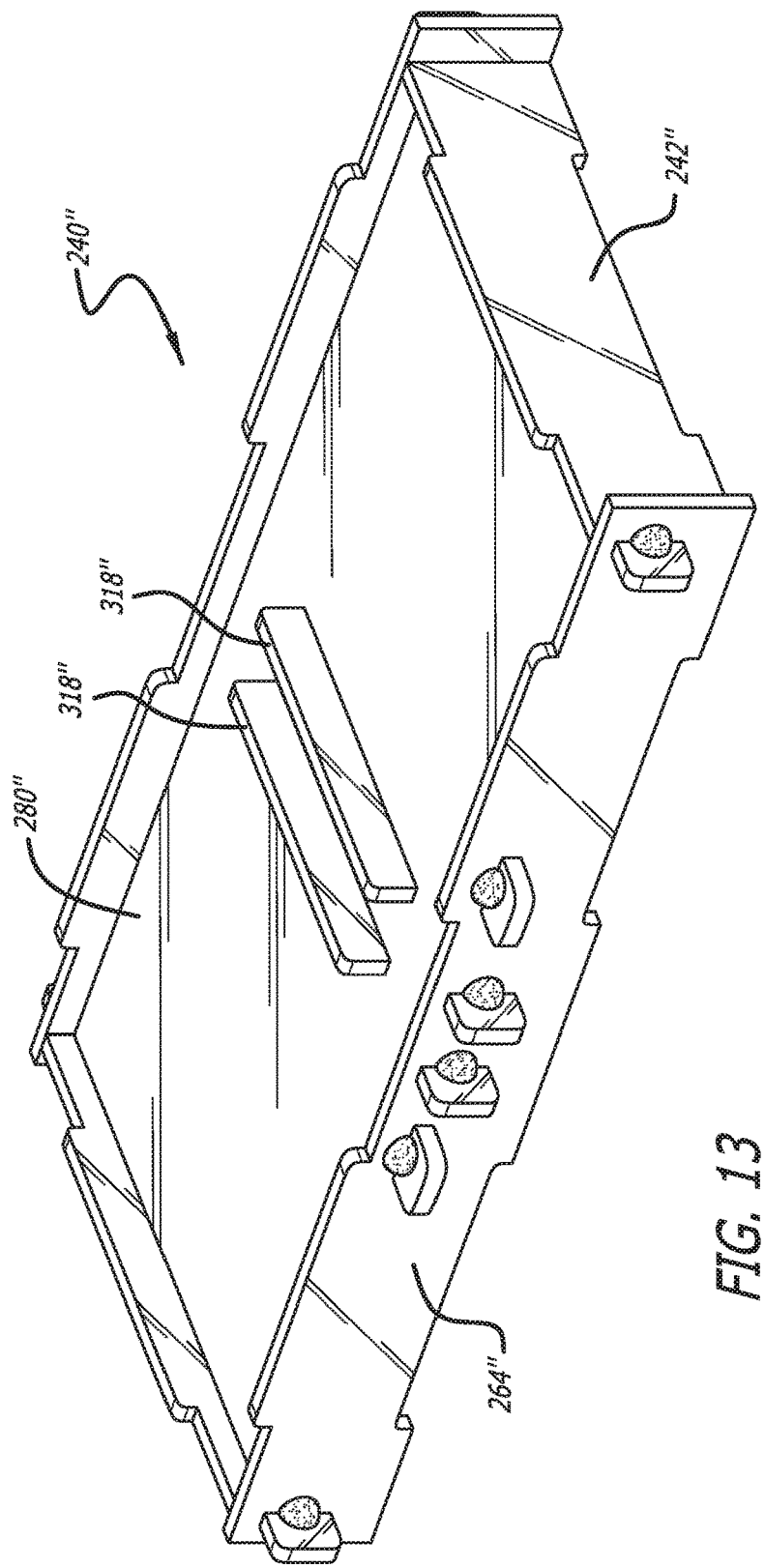
FIG. 13 is a perspective view of a display case cover module, according to another presently preferred embodiment of the invention.
Figure 14A:
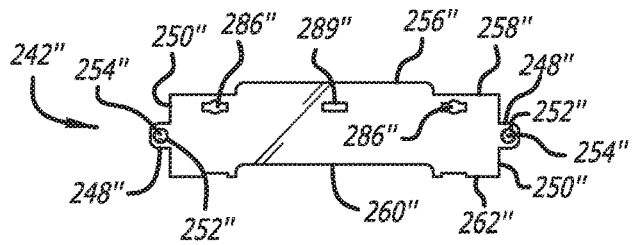
FIG. 14A is a plan view of a first sidewall panel member of a currently preferred variation of the display case cover module of FIG. 13.
Figure 14B:
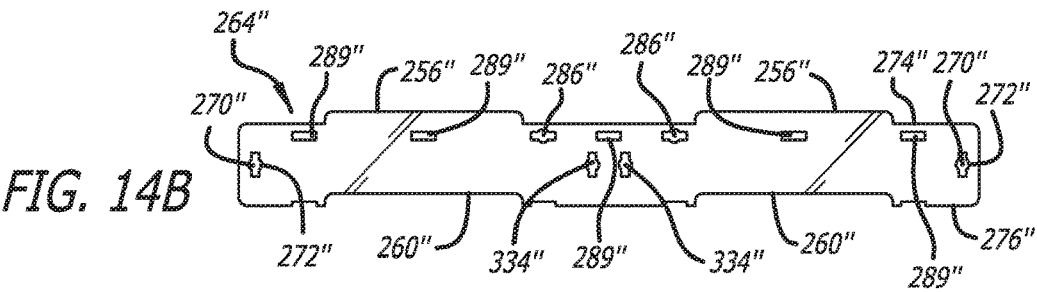
FIG. 14B is a plan view of a second sidewall panel member of the currently preferred variation of the display case cover module of FIG. 13.
Figure 14C:
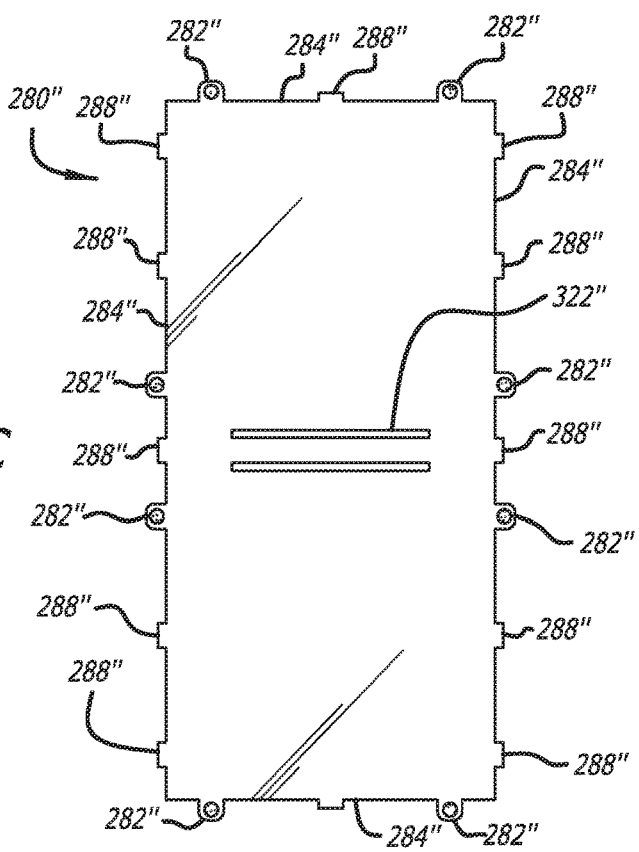
FIG. 14C is a plan view of a roof horizontal panel member of the currently preferred variation of the display case cover module of FIG. 13.
Figure 14D:
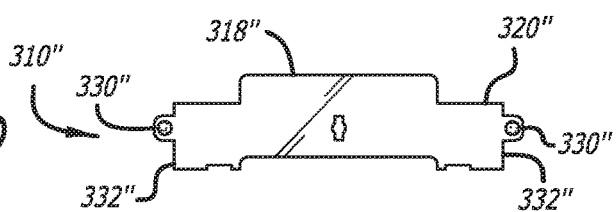
FIG. 14D is a plan view of a center support panel member of the currently preferred variation of the display case cover module of FIG. 13.

Referring to FIGS. 13 and 14A to 14D, another example of a module assembled with the interlocking panels is a display case cover 240", which is typically about 5 inches wide and about 10 inches long, and one common unit in height, such as about one inch in height, for example, although the display case cover module may be other multiples of the common unit in height. The display case cover includes a pair of generally rectangular, elongated first sidewall panel members 242" each including a pair of opposing side edge ball key or mortise or ball tabs 248" defined on the side edges 250" of the sidewall panel members, each of the side edge ball key or mortise or ball tabs including a ball key or mortise or ball retaining aperture 252". Although the panel members are preferably transparent, the module is shown in FIG. 13 as not transparent, for simplicity. The ball key or mortise or ball retaining apertures are preferably circular, and each ball key or mortise or ball retaining aperture contains a ball key 254" removably retained in the ball key or mortise or ball retaining aperture. The ball key is typically a round, resilient, compressible ball, typically formed of silicone rubber, for example, as described above, and is preferably a spherical, resilient, compressible ball, that can be pressed into or out of the ball key or mortise or ball retaining aperture.

For interlocking of vertically stacked modules, the first sidewall panel members also preferably include one or more display stacking key tabs 256" in a top side 258" of the first sidewall panel members, and one or more display stacking key slots 260" in a bottom side 262" of the first sidewall panel members for receiving a corresponding accessory box stacking key tab, respectively.

The display case cover also includes a pair of generally rectangular, elongated second sidewall panel members 264", each including a pair of opposing rectangular side edge ports or slots 270" for receiving a ball key or mortise or ball tab therein, each the pair of rectangular side edge ports or slots including a middle portion with opposing curved outwardly directed interior edge portions 272" extending through an approximate middle portion of the generally rectangular ball key tab connecting port or slot with opposing curved outwardly directed interior edge portions for removably receiving the ball key therein. The middle portions of the generally rectangular ball key tab connecting ports or slots of the second sidewall panel member preferably include a middle portion with circularly curved outwardly directed interior edges. For interlocking of vertically stacked modules, each of the second sidewall panel members also preferably includes first and second display stacking key tabs 256" in a top side 274" of the second sidewall panel members, and first and second display stacking key slots 260" in a bottom side 276" of each second sidewall panel member for receiving a corresponding accessory box stacking key tab.

The display case cover also includes a roof horizontal panel member 280" including first and second pairs of side edge ball key or mortise or ball tabs 282" defined on opposing first and second side edges 284" of the roof horizontal panel member, each of the side edge ball key or mortise or ball tabs including a ball key or mortise or ball retaining aperture extending therethrough, each of the ball key or mortise or ball retaining apertures including a ball key removably received therein. Each of the first and second sidewall panel members includes a pair of side edge ball key or mortise or ball connecting ports or slots 286" near the top side edge of each first sidewall panel member for removably receiving the corresponding first and second pairs of side edge ball key or mortise or ball tabs defined on the opposing first side edges of the roof horizontal panel member therein. Each of the second sidewall panel members also includes a pair of side edge ball key or mortise or ball connecting ports or slots extending through a top side edge of each second sidewall panel member for removably receiving the corresponding first and second pairs of side edge ball key or mortise or ball tabs defined on the opposing second side edges of the roof horizontal panel member therein The roof horizontal panel member also preferably includes opposing secondary, non-locking key tabs 288" defined on the opposing first and second side edges of each roof horizontal panel member, respectively. The first and second sidewall panel members correspondingly each include one or more secondary, non-locking key stacking key tab slots 289" for receiving the plurality of pairs of opposing display case key tabs 288" defined on the opposing second side edges of each roof horizontal panel member, respectively.

The display case cover also includes first and second generally rectangular, elongated center support panel members 310" each including a pair of opposing side edge ball key or mortise or ball tabs 330" defined on the side edges 332" of the first and second generally rectangular, elongated center support panel members, each of the side edge ball key or mortise or ball tabs including a ball key or mortise or ball retaining aperture, and each ball key or mortise or ball retaining aperture including a ball key removably received therein. In addition, each of the first and second generally rectangular, elongated center support panel members includes a top edge cover support tab 318" on a top edge 320". The roof horizontal panel member correspondingly includes a pair of cover support cutout slots 322" configured to receive the top edge cover support tabs of the first and second generally rectangular, elongated center support panel members, respectively.

During assembly of the display case cover into a module, ball keys preferably are inserted in the appropriate corresponding ball key retaining apertures of ball key tabs, spaced evenly within the ball key slots, and both of the sidewall panel members then are connected to the roof horizontal panel member. The center support panel members then are connected to the roof horizontal panel member, and finally the first and second sidewall panel members are connected together, to finish the assembly.

Figure 15:
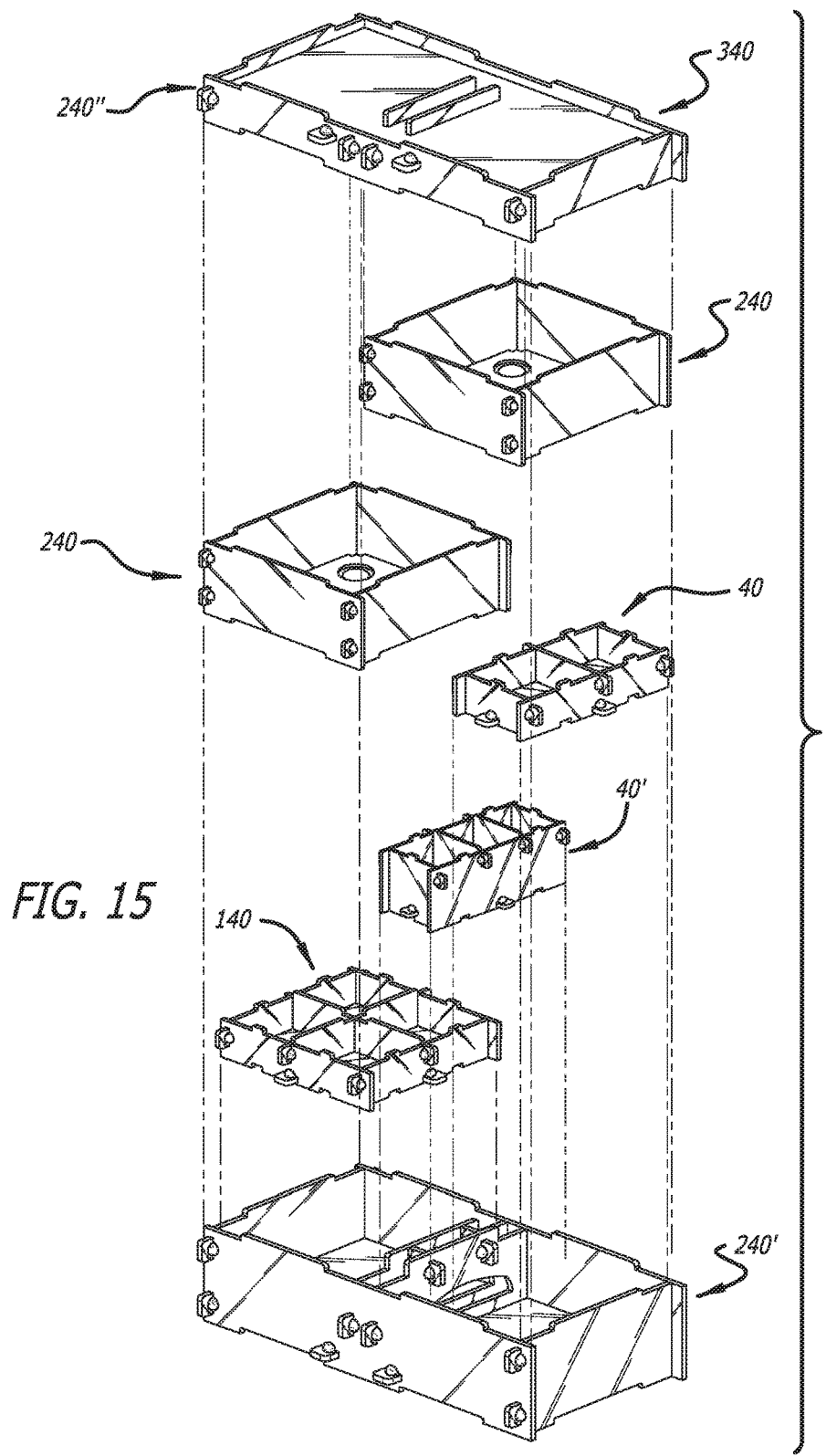
FIG. 15 is an exploded perspective view of a modular display case including an assembly of a plurality of modules with interlocking panels, according to the present invention.
Figure 16:
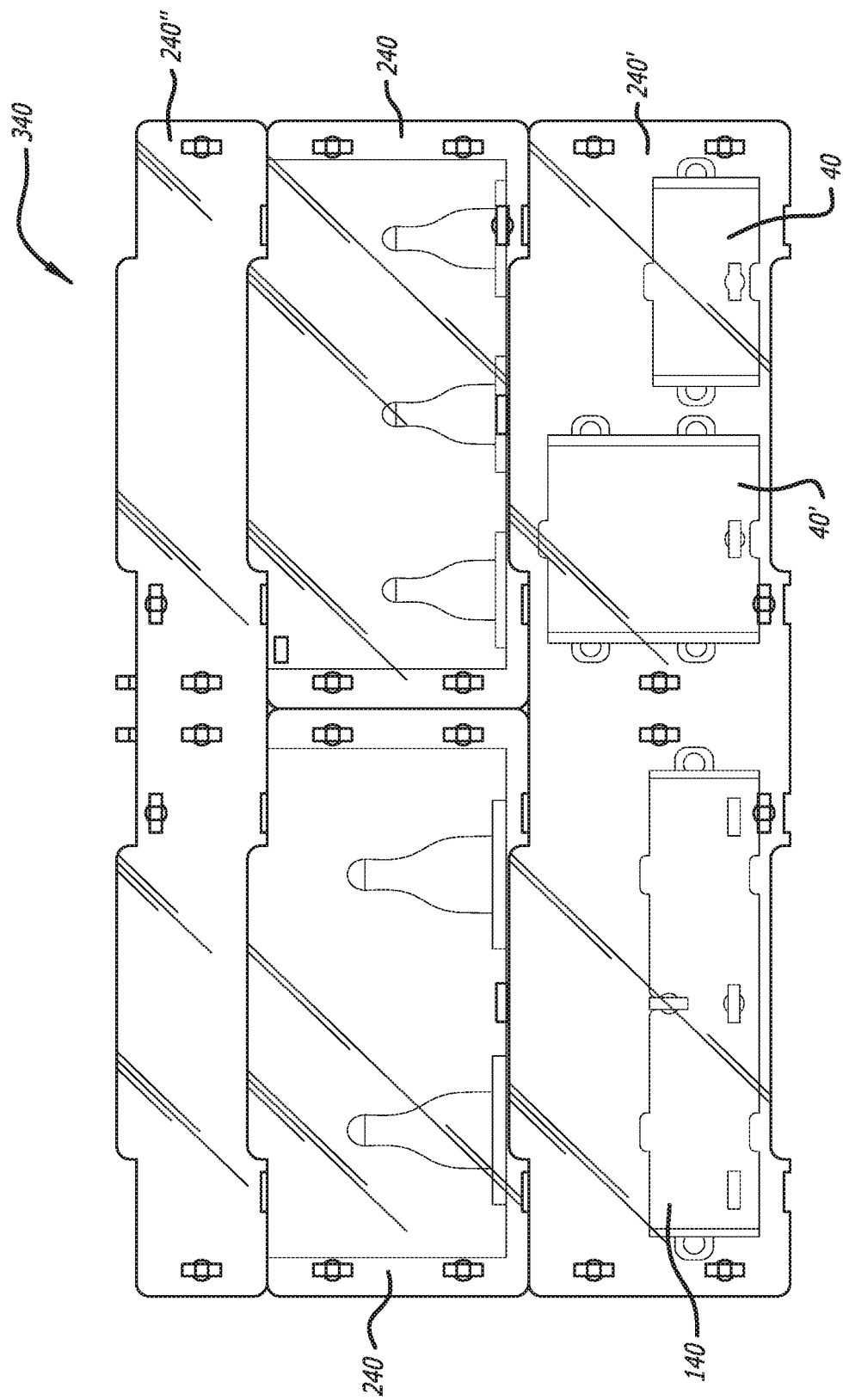
FIG. 16 is as side elevational view of the modular display case of FIG. 15 including an assembly of a plurality of modules with interlocking panels.
Figure 17A:
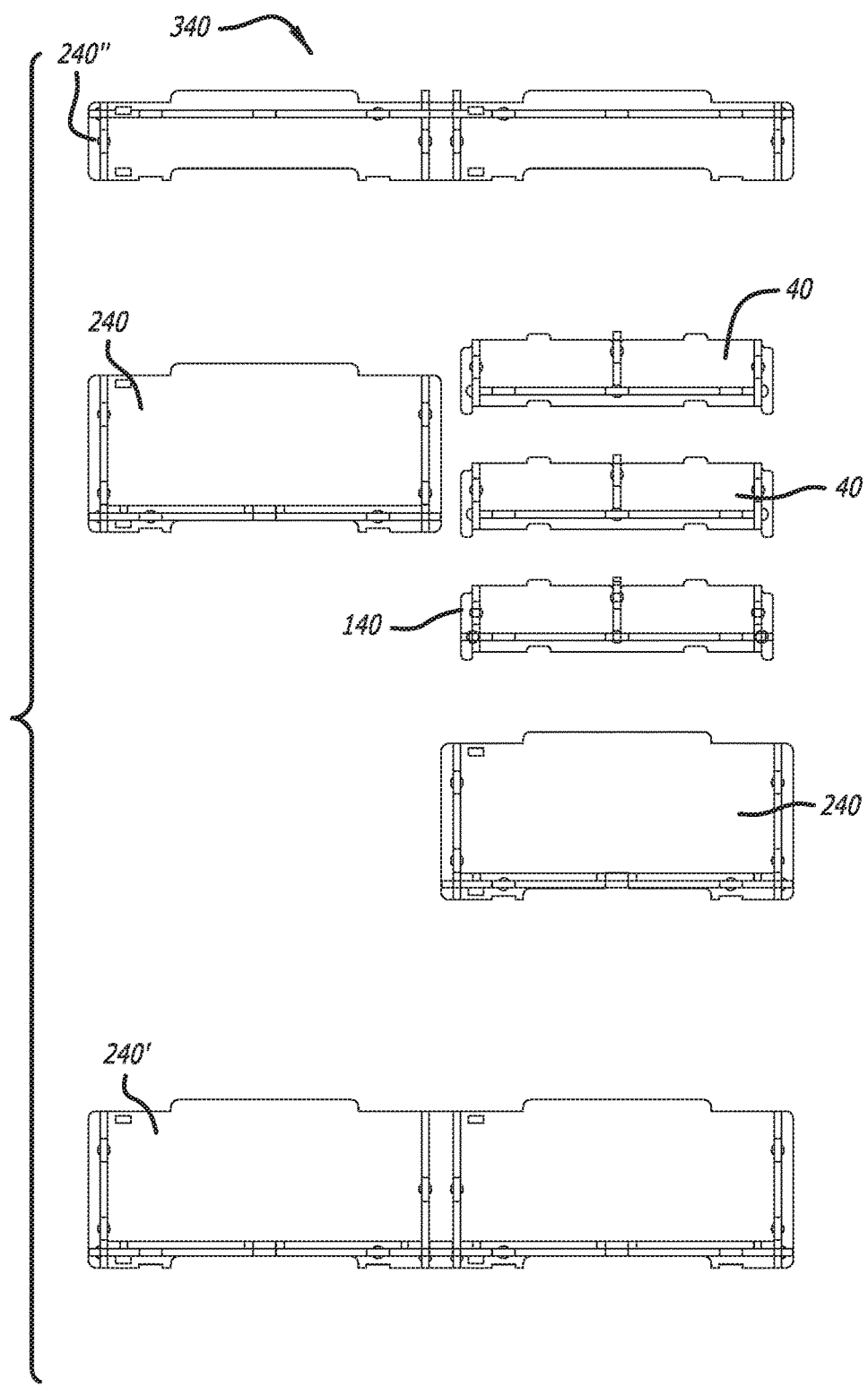
FIG. 17A is an exploded elevational view of a wider side of another version of a modular display case including an assembly of a plurality of modules with interlocking panels, according to the present invention.
Figure 17B:
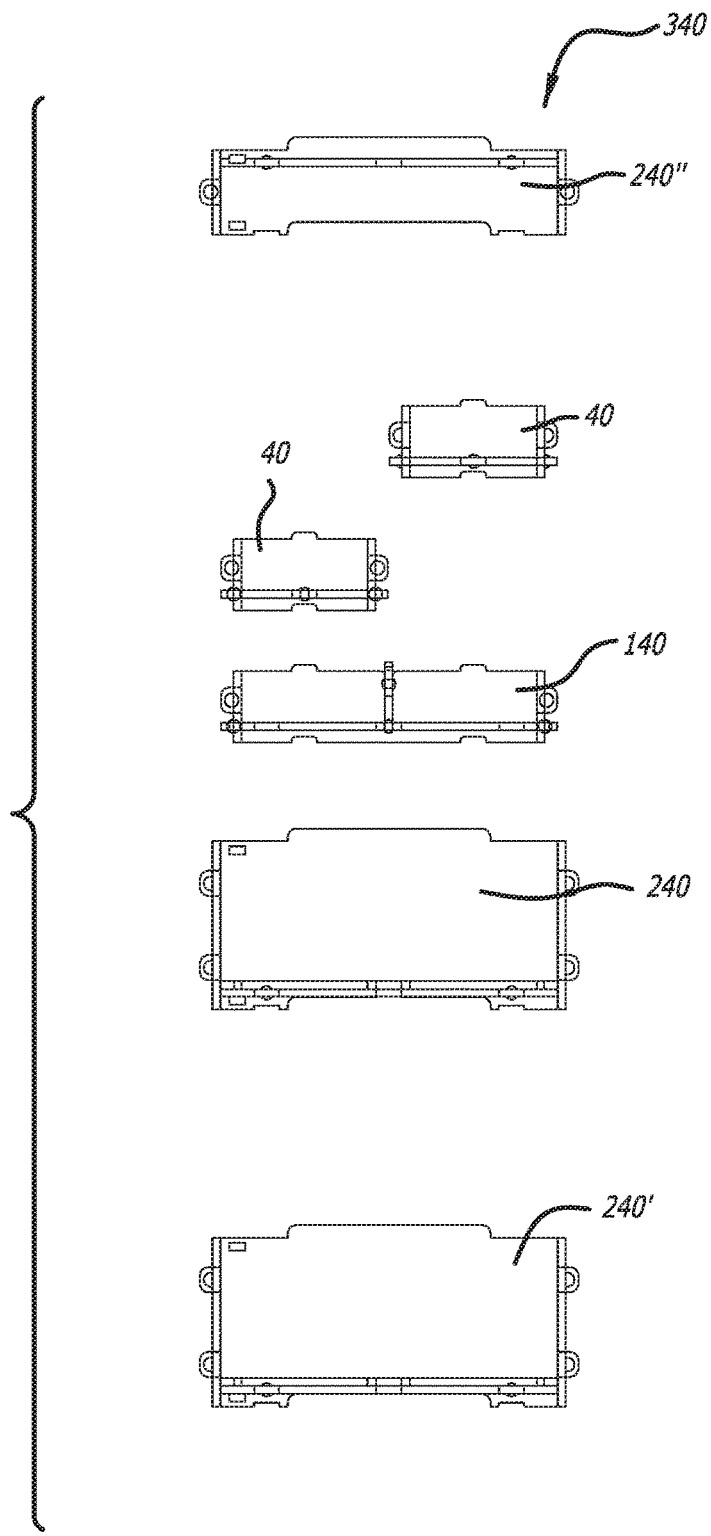
FIG. 17B is an exploded elevational view of a narrower side of the modular display case of FIG. 17A.
Figure 18A:
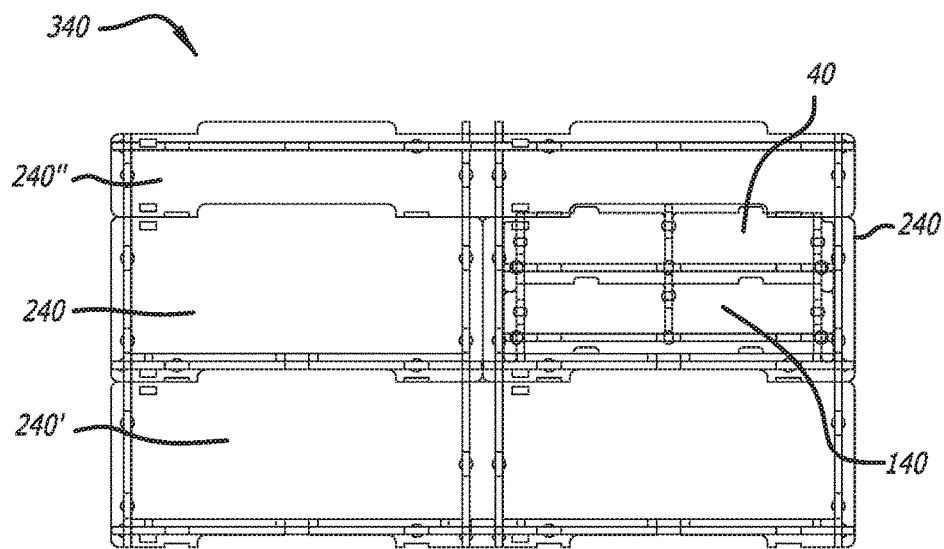
FIG. 18A is an elevational view of the assembled modular display case of FIGS. 17A and 17B.
Figure 18B:
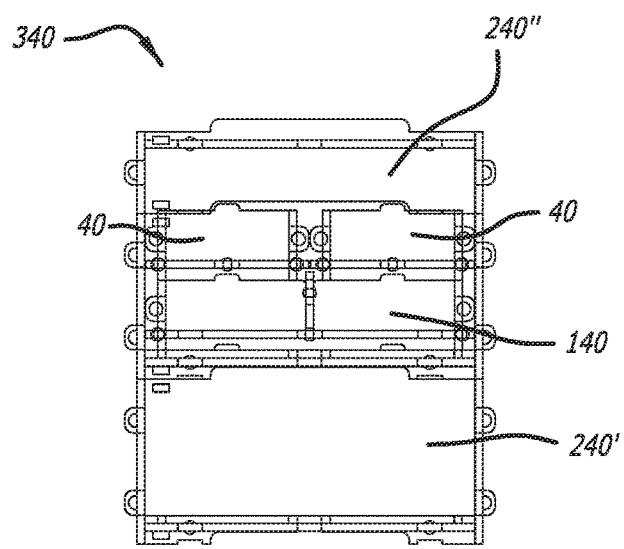
FIG. 18B is an elevational view of a narrower side of the assembled modular display case of FIGS. 17A and 17B.

Referring to FIGS. 15 and 16, in another presently preferred embodiment, the present invention provides for a modular display case 340 including an assembly of a plurality of the modules with interlocking panels described above. As is shown in FIG. 15, for example, the larger rectangular display case 240' can be used as a base for the modular display case 340. Various other smaller modules can be stacked directly upon the base horizontal panel member 280' of the larger rectangular display case 240'. As illustrated in FIGS. 15 and 16, a square accessory box 140 can be stacked directly upon the left side of the base horizontal panel member 280' of the larger rectangular display case 240', and a basic two unit height rectangular accessory box 40' and one of the basic rectangular accessory boxes 40 can be stacked directly upon the right side of the base horizontal panel member 280' of the larger rectangular display case 240', although two of the basic rectangular accessory boxes 40 stacked one upon the other could also be used. A square display case 240 then can be stacked upon the top edges of the sidewall panels on the left side of the larger rectangular display case 240' over the square accessory box 140, while another square display case 240 then can be stacked upon the top edges of the sidewall panels on the right side of the larger rectangular display case 240' over the square accessory box 140 and the one or two basic rectangular accessory boxes 40. The display case cover 240" then finally can be stacked upon the top edges of the sidewall panel members of the right and left side square display cases 240, to complete the assembly of the entire modular display case 340.

Referring to FIGS. 17A, 17B, 18A and 19B, showing another version of a modular display case including an assembly of a plurality of modules with interlocking panels, the modular display case 340 may include a display case cover 240" stacked upon two of the square display cases 240, which are stacked upon the larger rectangular display case 240', and a square accessory box 140 and two smaller basic rectangular accessory boxes 40 stacked upon the square accessory box 140 can be nested within one of the square display cases 240, which are stacked upon the larger rectangular display case 240'.

Figure 19A:
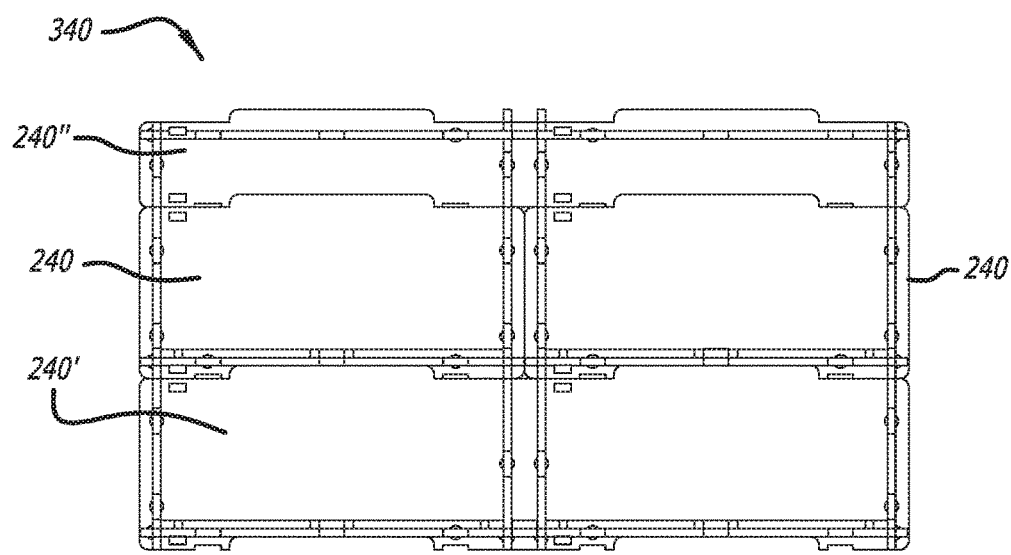
FIG. 19A is an elevational view of a wider side of another version of a modular display case including an assembly of a plurality of modules with interlocking panels, according to the present invention.
Figure 19B:
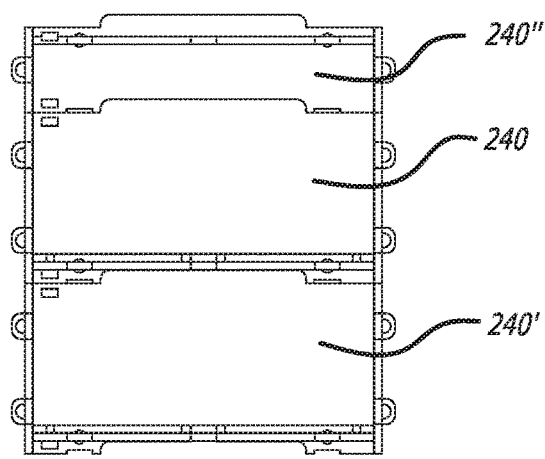
FIG. 19B is an elevational view of a narrower side of the modular display case of FIG. 18A.

Referring to FIGS. 19A and 19B, showing another version of a modular display case including an assembly of a plurality of modules with interlocking panels, the modular display case 340 may include a display case cover 240" stacked upon two of the square display cases 240, which are stacked upon the larger rectangular display case 240', which are stacked upon the larger rectangular display case 240', without including any accessory boxes.

In the method of manufacturing the interlocking panels of the invention, the outer side edges of the panel members are typically formed by rapid laser cutting of sheets of transparent, lightweight material, such as clear acrylic plastic, for example, while inner slots are typically formed by more slowly laser cutting of the material, to provide higher resolution, more accurately dimensioned features to higher tolerances and improved edge quality for better interfitting of parts, although slow laser cutting of these features is not necessarily critical, or required, for parts described above to be able to fit together properly. Features such as upwardly facing recesses for objects to be displayed or game items in the layout panel members, or decorative or alignment lines, or indicia provided in some of the panel members and typically facing inwardly in the modules, are typically formed by engraving, such as by chemical etching, for example. In general engraved surfaces of panel members preferably face upwardly or inwardly when modules are assembled, although this is not necessarily critical, or required.

It should be recognized that modules are rotatable within the larger display boxes, for different layouts. Silicone pads can be added to bottom sections so that display modules boxes will be non-skid, and can be placed between modules. It should also be recognized that the layout panel members can be dimensioned and arranged to match display items to be placed on the layout panel members, and that the display case cover can be used as a base for vertical stacking of other modules. The modules in this manner can be used to create a variety of displays, to create a diorama, such as for display on a shelf or in a box, and can be used as containers or organizers for game pieces, dice, a dice roller, cards and the like. In addition, adjacent first and second sidewall panel members may be provided with magnet slots 400 configured to receive correspondingly dimensioned magnets, to help secure modules that are stacked on top of each other, and to allow adjacent modules to self-align as they are being stacked. The magnets are configured to be oriented in order to attract to one another and automatically align the modules and assist in securing them together. A presently preferred magnet size is approximately 0.25 inch by 0.125 inch by 0.125 inch, which the presently preferred size of the magnet slots is approximately 0.2435 inch by 0.1185 inch. The difference in size accounts for the laser tolerance, which cuts away a small amount of material. The magnets fits snuggly in the magnet slots but typically require a small amount of adhesive, such as standard white glue, for example to secure the magnets in place.

It will be apparent from the foregoing that, while particular forms of the invention have been illustrated and described, various modifications can be made without departing from the spirit and scope of the invention. Accordingly, it is not intended that the invention be limited, except as by the appended claims.

I claim:

1. Interlocking panels configured to be removably assembled together, comprising:

a first panel member having a ball key tab, the ball key tab including a circular ball key retaining aperture defined in the ball key tab;

a ball key removably received in the circular ball key retaining aperture, the ball key comprises a round, resilient, compressible ball that can be pressed into and out of the ball key retaining aperture; and a second panel member including a ball key tab connecting port for removably receiving the ball key tab and the ball key for removably interconnecting the first panel and the second panel.

2. The interlocking panels of claim 1, wherein the ball key has a diameter that is greater than a diameter of the circular ball key retaining aperture.

3. The interlocking panels of claim 2, wherein the diameter of the circular ball key retaining aperture is 5.0 mm or less.

4. The interlocking panels of claim 1, wherein the ball key comprises silicone rubber having a Shore A hardness from about 60 to about 90.

5. The interlocking panels of claim 1, wherein the ball key comprises silicone rubber having a Shore A hardness from 70 to 85.

6. Interlocking panels configured to be removably assembled together, comprising:

a first panel member having a ball key tab, the ball key tab including a ball key retaining aperture defined in the ball key tab;

a ball key removably received in the ball key retaining aperture;

a second panel member including a ball key tab connecting port for removably receiving the ball key tab and the ball key; and wherein the ball key tab connecting port is generally rectangular and includes a circular aperture for removably receiving the ball key tab and the ball key for removably interconnecting the first panel and the second panel.

7. A module with interlocking panels, the module being configured to be removably connected with at least one other module with interlocking panels, the module comprising:

a pair of elongated first sidewall panel members, each of the elongated first sidewall panel members having opposing side edges, each of the opposing side edges of the elongated first sidewall panel members including a ball key tab, each ball key tab including a ball key retaining aperture;

a ball key removably received in each ball key retaining aperture;

a pair of elongated second sidewall panel members, each of the elongated second sidewall panel members having opposing side edges, each of the opposing side edges of the elongated second sidewall panel members including a ball key tab connecting port, corresponding ones of the ball key tabs and corresponding ones of the ball keys of the elongated first sidewall panel members being removably received in corresponding ones of the ball key tab connecting ports of the opposing side edges of the elongated second sidewall panel members, respectively; and wherein each of the ball keys has a diameter that is greater than a diameter of a circular ball key retaining aperture in the ball key tab retaining ports.

8. The module of claim 7, wherein the ball keys comprise a round, resilient, compressible ball that can be pressed into and out of the ball key retaining apertures.

9. The module of claim 8, wherein the ball keys comprise silicone rubber having a Shore A hardness from about 60 to about 90.

10. The module of claim 8, wherein the ball keys comprise silicone rubber having a Shore A hardness from 70 to 85.

11. The module of claim 7, further comprising at least one stacking key tab in a top side edge of each first sidewall panel member, and at least one stacking key slot in a bottom side edge of each first sidewall panel member for receiving a corresponding stacking key tab of another first sidewall panel member.

12. The module of claim 7, further comprising at least one corner stacking key tab in a bottom side corner of each second sidewall panel member, and at least one corner stacking key slot in a top corner side of each second sidewall panel member for receiving a corresponding corner stacking key tab of another second sidewall panel member.

13. The module of claim 7, further comprising a horizontal panel member removably connected to at least one pair of elongated first sidewall panel members and one pair of elongated second sidewall panel members.

14. The module of claim 13, wherein the horizontal panel member comprises a base panel member removably connected to a lower portion of the at least one of the pair of elongated first sidewall panel members and one of the pair of elongated second sidewall panel members.

15. The module of claim 13, wherein the horizontal panel member comprises a layout panel member including least one recess in a top side of the layout panel member for receiving a display item.

\* \* \* \* \*